United States Patent
Sugiura et al.

(10) Patent No.: US 11,242,898 B2
(45) Date of Patent: Feb. 8, 2022

(54) CLUTCH DEVICE

(71) Applicant: DENSO CORPORATION, Kariya (JP)

(72) Inventors: Takumi Sugiura, Kariya (JP); Akira Takagi, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 17/137,725

(22) Filed: Dec. 30, 2020

(65) Prior Publication Data
US 2021/0115983 A1 Apr. 22, 2021

Related U.S. Application Data

(63) Continuation of application No. PCT/JP2019/026653, filed on Jul. 4, 2019.

(30) Foreign Application Priority Data

Jul. 6, 2018 (JP) .............................. JP2018-128691
Jun. 6, 2019 (JP) .............................. JP2019-106252

(51) Int. Cl.
F16D 13/52 (2006.01)
F16D 23/12 (2006.01)
(Continued)

(52) U.S. Cl.
CPC ............ F16D 13/52 (2013.01); F16D 23/12 (2013.01); F16H 25/12 (2013.01); F16D 28/00 (2013.01); F16D 2023/123 (2013.01)

(58) Field of Classification Search
CPC ..................... F16D 2023/123; F16H 48/22–24
See application file for complete search history.

(56) References Cited

U.S. PATENT DOCUMENTS 5,080,640 A * 1/1992 Botterill ................ F16H 48/295
475/150
6,460,677 B1 * 10/2002 Roscoe ................. F16D 27/115
192/84.7
(Continued)

FOREIGN PATENT DOCUMENTS

JP 3-66927 3/1991
JP 11-270652 10/1999

OTHER PUBLICATIONS

U.S. Appl. No. 17/137,726, to Takagi, et al., entitled "Clutch Device",, filed Dec. 30, 2020 (57 pages).
(Continued)

Primary Examiner — Ernesto A Suarez
Assistant Examiner — James J Taylor, II
(74) Attorney, Agent, or Firm — Nixon & Vanderhye P.C.

(57) ABSTRACT

In a drive cam groove, a groove bottom is sloped such that a depth of the groove bottom continuously decreases from one end to the other end of the drive cam groove. The drive cam groove has: a first drive cam groove that is formed such that a distance between a center of a drive cam and the groove bottom at the first drive cam groove continuously changes from the one end toward the other end of the drive cam groove; and a second drive cam groove that is formed such that a distance between the center of the drive cam and the groove bottom at the second drive cam groove is constant from the first drive cam groove to the other end of the drive cam groove.

9 Claims, 11 Drawing Sheets

(51) Int. Cl.
F16D 28/00 (2006.01)
F16H 25/12 (2006.01)

(56) References Cited

U.S. PATENT DOCUMENTS

| | | | |
|---|---|---|---|
| 6,758,782 B2* | 7/2004 | Matzschker | F16D 28/00 |
| | | | 192/48.4 |
| 8,464,852 B2* | 6/2013 | Simon | F16D 13/04 |
| | | | 192/35 |
| 2002/0194941 A1 | 12/2002 | Hulsebusch et al. | |
| 2014/0077641 A1 | 3/2014 | Ratte et al. | |
| 2016/0238107 A1 | 8/2016 | Hirota et al. | |
| 2017/0045096 A1 | 2/2017 | Kishimoto et al. | |
| 2018/0080508 A1 | 3/2018 | Nahrwold et al. | |

OTHER PUBLICATIONS

U.S. Appl. No. 17/137,727, to Sugiura, et al., entitled "Rolling Element Cam and Clutch Device Using Same", filed Dec. 30, 2020 (70 pages).
U.S. Appl. No. 17/137,730, to Ishibashi, et al., entitled "Clutch Device", filed Dec. 30, 2020 (47 pages).
U.S. Appl. No. 17/137,725, filed Dec. 30, 2020, Clutch Device.
U.S. Appl. No. 17/137,726, filed Dec. 30, 2020, Clutch Device.
U.S. Appl. No. 17/137,727, filed Dec. 30, 2020, Rolling Element Cam and Clutch Device Using Same.
U.S. Appl. No. 17/137,730, filed Dec. 30, 2020, Clutch Device.

* cited by examiner

CLUTCH DEVICE

CROSS REFERENCE TO RELATED APPLICATIONS

This application is a continuation application of International Patent Application No. PCT/JP2019/026653 filed on Jul. 4, 2019, which designated the U.S. and claims the benefit of priority from Japanese Patent Application No. 2018-128691 filed on Jul. 6, 2018 and Japanese Patent Application No. 2019-106252 filed on Jun. 6, 2019. The entire disclosures of all of the above applications are incorporated herein by reference.

TECHNICAL FIELD

The present disclosure relates to a clutch device.

BACKGROUND

Previously, there is known a clutch device that can shift its operational state to a coupled state or a decoupled state to enable or disable transmission of torque between a first transmitter and a second transmitter through a clutch.

SUMMARY

This section provides a general summary of the disclosure, and is not a comprehensive disclosure of its full scope or all of its features.

According to the present disclosure, there is provided a clutch device that includes a first transmitter, a drive device, a speed reducer, a drive cam, a plurality of rolling elements, a drive cam, a second transmitter and a clutch. The drive device is configured to output torque. The speed reducer is configured to reduce a rotational speed of rotation generated by the torque received from the drive device and output the torque of the rotation of the reduced rotational speed. The drive cam has a plurality of drive cam grooves formed at one end surface of the drive cam. The drive cam is configured to be rotated by the torque outputted from the speed reducer. Each of the plurality of rolling elements is rotatably installed in a corresponding one of the plurality of drive cam grooves. The driven cam has a plurality of driven cam grooves formed at one end surface of the driven cam while each of the plurality of rolling elements is clamped between a corresponding one of the plurality of drive cam grooves and a corresponding one of the plurality of driven cam grooves. The driven cam cooperates with the drive cam and the plurality of rolling elements to form a rolling element cam. When relative rotation is made between the driven cam and the drive cam, the driven cam is moved in an axial direction relative to the drive cam. The second transmitter is configured to transmit the torque between the first transmitter and the second transmitter. The clutch is configured to enable transmission of the torque between the first transmitter and the second transmitter in a coupled state of the clutch and disable the transmission of the torque between the first transmitter and the second transmitter in a decoupled state of the clutch.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
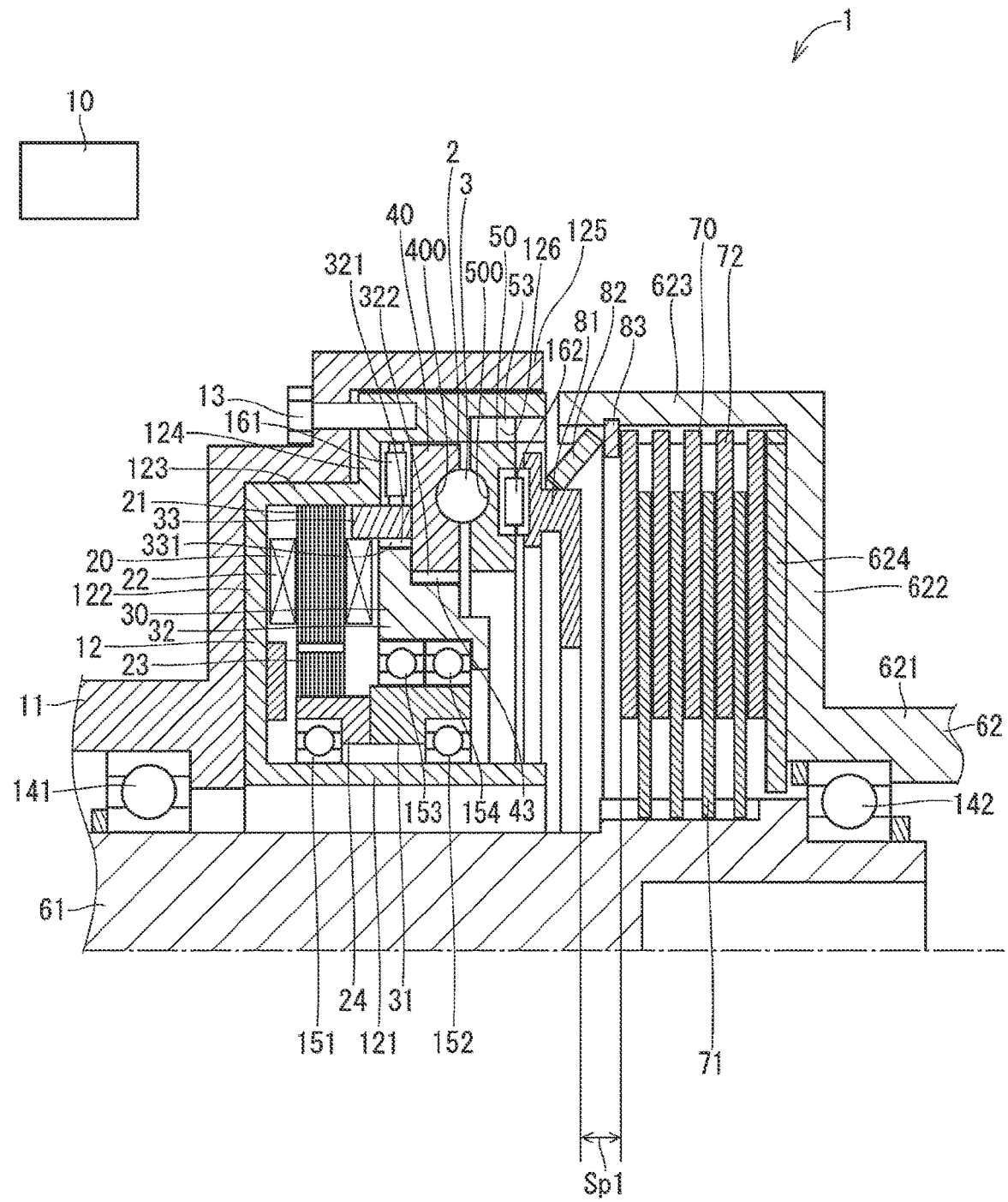
FIG. 1 is a cross-sectional view of a clutch device according to a first embodiment.

Previously, there is known a clutch device that can shift its operational state to a coupled state or a decoupled state to enable or disable transmission of torque between a first transmitter and a second transmitter through a clutch.

For example, there has been proposed a clutch device, in which a speed reducer reduces a rotational speed of rotation generated by torque received from a drive device and outputs the torque of the reduced rotational speed to a drive cam of a ball cam to rotate the drive cam, so that a driven cam of the ball cam is moved by the drive cam in an axial direction. Thus, an operational state of the clutch can be shifted to a coupled state or a decoupled state through a state shifter.

In the above clutch device, the ball cam includes a ball which can be rolled between a drive cam groove of the drive cam and a driven cam groove of the driven cam. A groove bottom of the drive cam groove and a groove bottom of the driven cam groove are sloped relative to an end surface of the drive cam or an end surface of the driven cam. When relative rotation is made between the drive cam and the driven cam, the ball is rolled between the drive cam groove and the driven cam groove. Thus, relative movement is made in the axial direction between the drive cam and the driven cam according to the slope angle of the groove bottom of the drive cam groove and the slope angle of the groove bottom of the driven cam groove.

In the above clutch device, the drive cam groove may be formed as one of a plurality of drive cam grooves, and the driven cam groove may be formed as one of a plurality of driven cam grooves, and each ball may be placed between the corresponding one of the drive cam grooves and the corresponding one of the driven cam grooves. Furthermore, the drive cam grooves and the driven cam grooves may be respectively shaped in a form of an arc, so that a distance from a center of the drive cam to the drive cam groove is constant along an entire circumferential extent of the drive cam groove, and a distance from a center of the driven cam to the driven cam groove is constant along an entire circumferential extent of the driven cam groove. Thus, it may be required to have a predetermined space between each adjacent two of the drive cam grooves and also between each adjacent two of the driven cam grooves to avoid contact between the adjacent two of the drive cam grooves and contact between the adjacent two of the driven cam grooves. Therefore, a length (arc length) of each drive cam groove measured in the circumferential direction of the drive cam and a length (arc length) of each driven cam groove measured in the circumferential direction of the driven cam may possibly be reduced. As a result, the slope angle of the groove bottom of each drive cam groove and the slope angle of the groove bottom of each driven cam groove may possibly be increased in a case where the sufficient amount of movement of the driven cam in the axial direction relative to a relative rotational angle difference between the drive cam and the driven cam is ensured. Thereby, the required maximum torque of the drive device may be increased, and a size of the drive device may be increased. Thus, a size of the clutch device may be increased.

According to the present disclosure, there is provided a clutch device that includes a first transmitter, a drive device, a speed reducer, a drive cam, a plurality of rolling elements, a driven cam, a second transmitter, a clutch and a state shifter.

The drive device is configured to output torque. The speed reducer is configured to reduce a rotational speed of rotation generated by the torque received from the drive device and output the torque of the rotation of the reduced rotational speed. The drive cam has a plurality of drive cam grooves formed at one end surface of the drive cam. The drive cam is configured to be rotated by the torque outputted from the speed reducer. Each of the plurality of rolling elements is rotatably installed in a corresponding one of the plurality of drive cam grooves. The driven cam has a plurality of driven cam grooves formed at one end surface of the driven cam while each of the plurality of rolling elements is clamped between a corresponding one of the plurality of drive cam grooves and a corresponding one of the plurality of driven cam grooves. The driven cam cooperates with the drive cam and the plurality of rolling elements to form a rolling element cam, and when relative rotation is made between the driven cam and the drive cam, the driven cam is moved in an axial direction relative to the drive cam.

The second transmitter is configured to transmit the torque between the first transmitter and the second transmitter. The clutch is configured to enable transmission of the torque between the first transmitter and the second transmitter in a coupled state of the clutch and disable the transmission of the torque between the first transmitter and the second transmitter in a decoupled state of the clutch. The state shifter is configured to receive a force from the driven cam in the axial direction and shift an operational state of the clutch between the coupled state and the decoupled state depending on a relative position of the driven cam relative to the drive cam in the axial direction.

In each of the plurality of drive cam grooves, a groove bottom is sloped relative to the one end surface of the drive cam such that a depth of the groove bottom continuously decreases from one end to another end of the drive cam groove in a circumferential direction of the drive cam. Each of the plurality of drive cam grooves has a first drive cam groove and a second drive cam groove. The first drive cam groove is formed such that a distance between a center of the drive cam and the groove bottom at the first drive cam groove continuously changes from the one end toward the another end of the drive cam groove. The second drive cam groove is connected to the first drive cam groove and is formed such that a distance between the center of the drive cam and the groove bottom at the second drive cam groove is constant from the first drive cam groove to the another end of the drive cam groove.

In each of the plurality of driven cam grooves, a groove bottom is sloped relative to the one end surface of the driven cam such that a depth of the groove bottom continuously decreases from one end to another end of the driven cam groove in a circumferential direction of the driven cam. Each of the plurality of driven cam grooves has a first driven cam groove and a second driven cam groove. The first driven cam groove is formed such that a distance between a center of the driven cam and the groove bottom at the first driven cam groove continuously changes from the one end toward the another end of the driven cam groove. The second driven cam groove is connected to the first driven cam groove and is formed such that a distance between the center of the driven cam and the groove bottom at the second driven cam groove is constant from the first driven cam groove to the another end of the driven cam groove.

In the present disclosure, each of the second drive cam groove and the second driven cam groove is formed such that the distance, which is measured between the center of the drive cam or the driven cam and the second drive cam groove or the second driven cam groove, is constant, and each of the first drive cam groove and the first driven cam groove is formed such that the distance, which is measured between the center of the drive cam or the driven cam and the first drive cam groove or the first driven cam groove, continuously changes. Therefore, even when a length of the drive cam groove measured in the circumferential direction of the drive cam and a length of the driven cam groove measured in the circumferential direction of the driven cam are increased, it is possible to limit occurrence of connecting between each adjacent two of the drive cam grooves and occurrence of connecting between each adjacent two of the driven cam grooves.

Thus, the length of each drive cam groove measured in the circumferential direction of the drive cam and the length of each driven cam groove measured in the circumferential direction of the driven cam can be easily increased. Thereby, the slope angle of the groove bottom of the drive cam groove and the slope angle of the groove bottom of the driven cam groove can be decreased while ensuring the required amount of axial movement of the driven cam relative to the drive cam relative to the relative rotational angle difference between the drive cam and the driven cam. As a result, the required maximum torque of the drive device can be reduced, and the size of the drive device can be reduced. Thus, the size of the clutch device can be reduced.

Hereinafter, a clutch device according to a plurality of embodiments will be described with reference to the drawings. In addition, in the following embodiments, the substantially same components are denoted by the same reference signs, and the description thereof will be omitted. Furthermore, in the following embodiments, substantially the same constituent parts have the same or similar action and effect.

First Embodiment

FIG. 1 indicates a clutch device according to a first embodiment. The clutch device 1 is installed, for example, between an internal combustion engine and a transmission at a vehicle and is used to enable or disable transmission of torque between the internal combustion engine and the transmission.

The clutch device 1 includes: an electronic control unit (hereinafter referred to as an ECU) 10, which serves as a controller; an input shaft 61, which serves as a first transmitter; an electric motor 20, which serves as a drive device; a speed reducer 30; a drive cam 40; a plurality of balls 3; a driven cam 50; an output shaft 62, which serves as a second transmitter; a clutch 70; and a piston 81, which serves as a state shifter.

The ECU 10 is a microcomputer that includes: a CPU, which serves as an arithmetic unit; a ROM, a RAM and an EEPROM, which serve as a storage unit; and an I/O device, which serves as an input/output unit. The ECU 10 controls various devices and instruments of the vehicle by executing various computing operations according to a program stored in the ROM or the like based on information such as signals from various sensors provided in corresponding parts of the vehicle. As described above, the ECU 10 executes the program stored in the non-transitory computer-readable storage medium. By executing this program, a method corresponding to the program is executed.

The ECU 10 can control the operation of, for example, the internal combustion engine based on the information such as signals from the various sensors. Further, the ECU 10 can control the operation of the electric motor 20 described later.

The input shaft 61 is connected to, for example, a drive shaft of the internal combustion engine (not shown) and can be rotate together with the drive shaft. That is, torque is input to the input shaft 61 from the drive shaft.

A stationary flange 11 is installed to the vehicle that has the internal combustion engine. The stationary flange 11 is shaped in a tubular form and is fixed to, for example, an engine room of the vehicle. A bearing 141 is installed between an inner peripheral wall of the stationary flange 11 and an outer peripheral wall of the input shaft 61. Therefore, the input shaft 61 is rotatably supported by the stationary flange 11 through the bearing 141.

The housing 12 is placed between an inner peripheral wall of an end part of the stationary flange 11 and the outer peripheral wall of the input shaft 61. The housing 12 includes an inner tubular portion 121, an inner bottom portion 122, an outer tubular portion 123, an outer bottom portion 124, an outer tubular portion 125 and a plurality of spline grooves 126.

The inner tubular portion 121 is shaped generally in a cylindrical tubular form. The inner bottom portion 122 is formed integrally with the inner tubular portion 121 in one-piece such that the inner bottom portion 122 is shaped in a ring plate form and radially outwardly extends from an end part of the inner tubular portion 121. The outer tubular portion 123 is formed integrally with the inner bottom portion 122 in one-piece such that the outer tubular portion 123 is shaped generally in a cylindrical tubular form and extends from an outer peripheral part of the inner bottom portion 122 toward the outer bottom portion 124. The outer bottom portion 124 is formed integrally with the outer tubular portion 123 in one-piece such that the outer bottom portion 124 is shaped in a ring plate form and radially outwardly extends from an end part of the outer tubular portion 123, which is opposite to the inner bottom portion 122. The outer tubular portion 125 is formed integrally with the outer bottom portion 124 such that the outer tubular portion 125 is shaped generally in a cylindrical tubular form and extends from an outer peripheral part of the outer bottom portion 124 toward a side that is opposite to the outer tubular portion 123. The spline grooves 126 are formed at an inner peripheral wall of an end part of the outer tubular portion 125, which is opposite to the outer bottom portion 124. The spline grooves 126 are arranged one after another in a circumferential direction of the outer tubular portion 125 and extend from an end part of the outer tubular portion 125 toward the outer bottom portion 124.

The housing 12 is installed to the stationary flange 11 such that an outer peripheral wall of the outer tubular portion 123 and an outer peripheral wall of the outer tubular portion 125 are opposed to an inner peripheral wall of an end part of the stationary flange 11. The housing 12 is fixed to the stationary flange 11 by bolts 13. Here, the housing 12 is coaxial with the stationary flange 11 and the input shaft 61. A space, which is shaped generally in a cylindrical tubular form, is formed between an inner peripheral wall of the inner tubular portion 121 and the outer peripheral wall of the input shaft 61.

The electric motor 20 includes a stator 21, a coil 22, a rotor 23 and a shaft 24. The stator 21 is formed by, for example, laminated steel plates and is shaped generally in a circular ring form, and the stator 21 is fixed to an inside of the outer tubular portion 123. The coil 22 is wound around the stator 21. The rotor 23 is formed by, for example, laminated steel plates and is shaped generally in a circular ring form, and the rotor 23 is placed at an inside of the stator 21 such that the rotor 23 is rotatable relative to the stator 21. The shaft 24 is shaped generally in a cylindrical tubular form, and the shaft 24 is installed to an inside of the rotor 23 and is integrated with the rotor 23. The shaft 24 is located on a radially outer side of the inner tubular portion 121 of the housing 12. A bearing 151 is installed between an inner peripheral wall of the shaft 24 and an outer peripheral wall of the inner tubular portion 121. In this way, the rotor 23 and the shaft 24 are rotatably supported by the inner tubular portion 121 through the bearing 151.

The ECU 10 is configured to control an operation of the electric motor 20 by controlling the electric power supplied to the coil 22. When the electric power is supplied to the coil 22, a rotating magnetic field is generated at the stator 21. Thereby, the rotor 23 is rotated. Thus, the torque is outputted from the shaft 24. As described above, the electric motor 20 is configured to output the torque.

The speed reducer 30 includes an eccentric portion 31, a planetary gear 32 and a ring gear 33. The eccentric portion 31 is shaped in a tubular form such that an outer peripheral wall of the eccentric portion 31 is eccentric to an inner peripheral wall of the eccentric portion 31. The eccentric portion 31 is located on a radially outer side of the inner tubular portion 121 and is formed integrally with the shaft 24 such that the inner peripheral wall of the eccentric portion 31 is coaxial with the shaft 24. Specifically, the eccentric portion 31 and the shaft 24 are not rotatable relative to each other. Therefore, the eccentric portion 31 is rotatable integrally with the shaft 24 in a state where the outer peripheral wall of the eccentric portion 31 is eccentric to the shaft 24. A bearing 152 is installed between the inner peripheral wall of the eccentric portion 31 and the outer peripheral wall of the inner tubular portion 121. Thus, the eccentric portion 31 is rotatably supported by the inner tubular portion 121 through the bearing 152.

The planetary gear 32 is shaped generally in a circular ring form. The planetary gear 32 has a plurality of primary external teeth 321 and a plurality of secondary external teeth 322. The primary external teeth 321 are formed at an outer peripheral wall of one end part of the planetary gear 32. The secondary external teeth 322 are formed on the other axial end side of the primary external teeth 321 of the planetary gear 32. A diameter of an addendum circle of the secondary external teeth 322 is smaller than a diameter of an addendum circle of the primary external teeth 321. The primary external teeth 321 and the secondary external teeth 322 are coaxial with an inner peripheral wall of the planetary gear 32.

The planetary gear 32 is located on a radially outer side of the eccentric portion 31. A bearing 153 and a bearing 154 are installed between the inner peripheral wall of the planetary gear 32 and the outer peripheral wall of the eccentric portion 31. Thus, the planetary gear 32 is rotatably supported by the eccentric portion 31 through the bearing 153 and the bearing 154. The planetary gear 32 is coaxially rotatable relative to the eccentric portion 31 and is rotatable relative to the shaft 24 in a state where the planetary gear 32 is eccentric to the shaft 24.

The ring gear 33 is shaped generally in a ring form. The ring gear 33 has a plurality of internal teeth 331. The internal teeth 331 are formed at an inner peripheral wall of one end part of the ring gear 33. The ring gear 33 is fixed to the housing 12 such that an outer peripheral wall of an end part of the ring gear 33, which is opposite to the internal teeth 331, is fitted to an inner peripheral wall of an end part of the outer tubular portion 123 of the housing 12. A diameter of an addendum circle of the internal teeth 331 is larger than the diameter of the addendum circle of the primary external teeth 321 of the planetary gear 32. Furthermore, the number of the internal teeth 331 is larger than the number of the primary external teeth 321.

Figure 5:
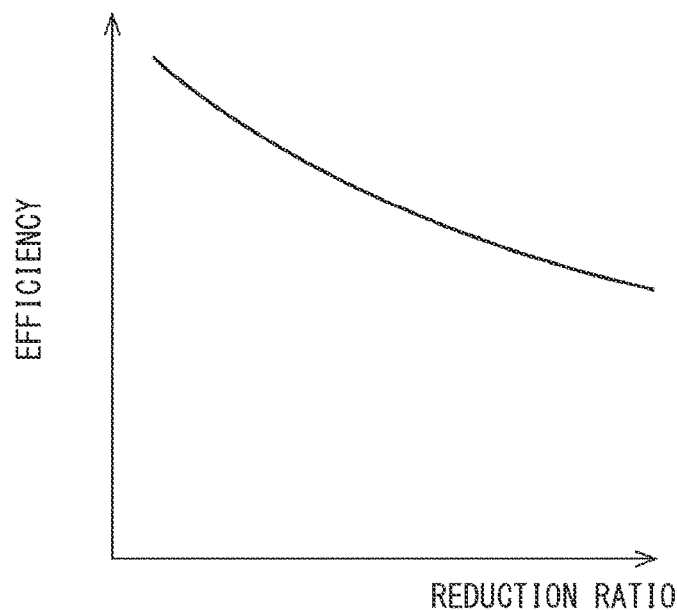
FIG. 5 is a diagram indicating a relationship between a reduction ratio and efficiency of a speed reducer.

The planetary gear 32 is installed such that the primary external teeth 321 are meshed with the internal teeth 331 of the ring gear 33. Therefore, when the rotor 23 and the shaft 24 are rotated, the planetary gear 32 is revolved and rotated at an inside of the ring gear 33 while the primary external teeth 321 of the planetary gear 32 are meshed with the internal teeth 331 of the ring gear 33. With the above-described configuration, the speed reducer 30 reduces a rotational speed of rotation generated by the torque received from the electric motor 20 and outputs the torque of the rotation of the reduced rotational speed through the planetary gear 32. As described above, the speed reducer 30 is configured to reduce the rotational speed of the rotation generated by the torque received from the electric motor 20 and output the torque of the rotation of the reduced rotational speed. Here, a speed reduction ratio of the speed reducer 30 is set by appropriately setting the number of the primary external teeth 321 of the planetary gear 32 and the number of the internal teeth 331 of the ring gear 33. Generally, the efficiency of the speed reducer is higher as the speed reduction ratio is smaller (see FIG. 5).

Figure 2:
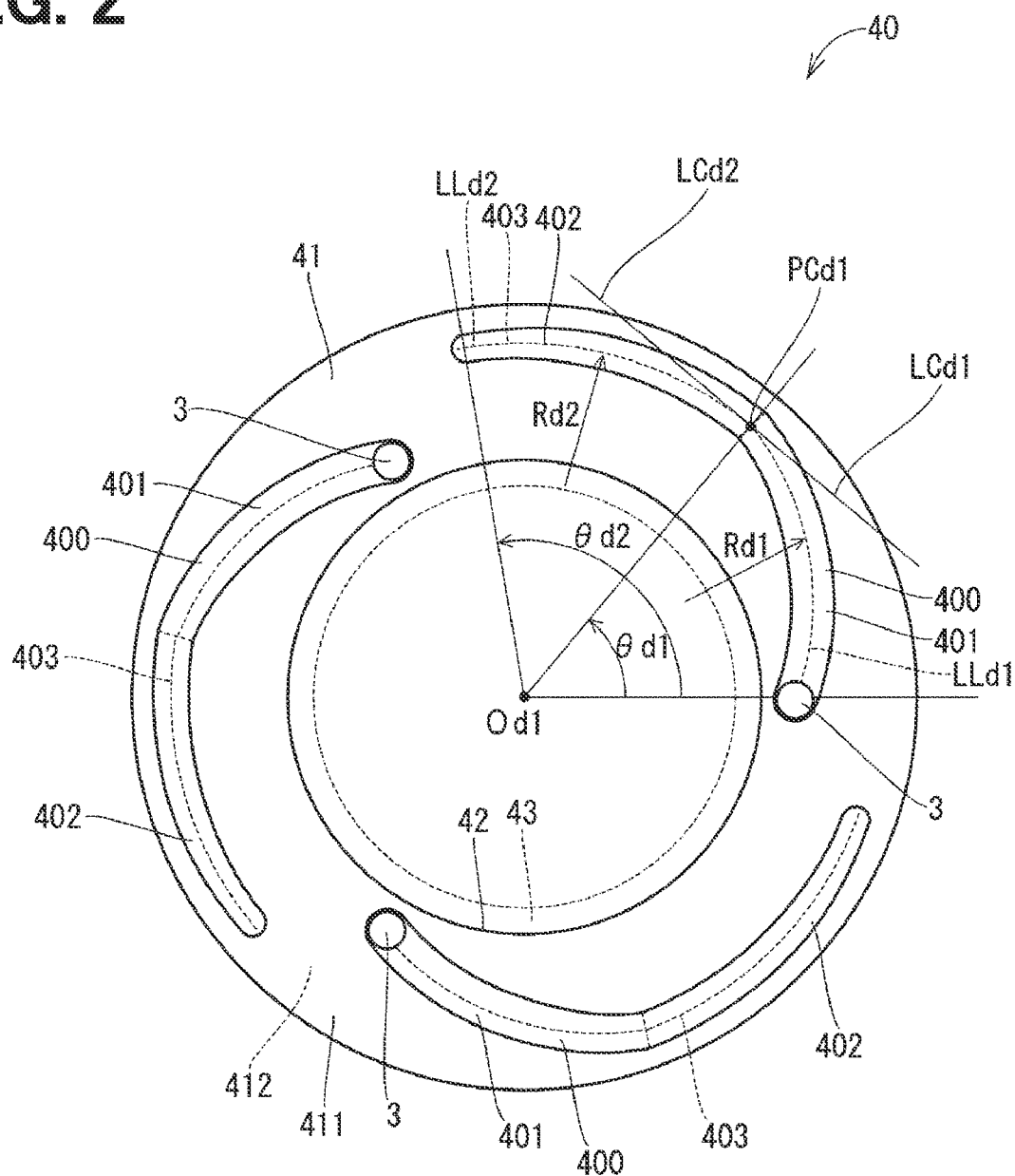
FIG. 2 is a diagram indicating a drive cam of the clutch device according to the first embodiment.

The drive cam 40 includes a drive cam main body 41, a drive cam hole 42, a plurality of drive cam internal teeth 43 and a plurality of drive cam grooves 400 (see FIG. 2). The drive cam main body 41 is shaped generally in a circular plate form and is made of, for example, metal. The drive cam hole 42 is shaped in a circular form and is coaxial with the drive cam main body 41 such that the drive cam hole 42 extends through a center of the drive cam main body 41. The drive cam internal teeth 43 are formed integrally with the drive cam hole 42 in one-piece at an inner side of the drive cam hole 42.

The drive cam grooves 400 are recessed from one end surface 411 of the drive cam main body 41 toward the other end surface 412 of the drive cam main body 41. The number of the drive cam grooves 400 formed at the drive cam main body 41 is three. In each of the drive cam grooves 400, a groove bottom 403 is sloped relative to the one end surface 411 of the drive cam 40 such that a depth of the groove bottom 403 continuously decreases from one end to the other end of the drive cam groove 400 in a circumferential direction of the drive cam 40. Details of the drive cam grooves 400 will be described later.

A diameter of an addendum circle of the drive cam internal teeth 43 is larger than the diameter of the addendum circle of the secondary external teeth 322 of the planetary gear 32. Furthermore, the number of the drive cam internal teeth 43 is larger than the number of the secondary external teeth 322. The drive cam 40 is placed at an inside of the outer tubular portion 125 of the housing 12 on a side of the ring gear 33, which is opposite to the stator 21, such that the drive cam internal teeth 43 are meshed with the secondary external teeth 322 of the planetary gear 32. Therefore, when the planetary gear 32 is rotated and revolved at the inside of the ring gear 33 in response to rotation of the rotor 23 and the shaft 24, the drive cam 40 is rotated at the inside of the outer tubular portion 125 of the housing 12 relative to the housing 12. As described above, the drive cam 40 has the drive cam grooves 400 formed at the one end surface 411 of the drive cam 40, and the drive cam 40 is configured to be rotated by the torque outputted from the speed reducer 30.

A thrust bearing 161 is placed on the radially outer side of the ring gear 33 at a location that is between an outer peripheral part of the drive cam 40 and the outer bottom portion 124 of the housing 12. The thrust bearing 161 rotatably supports the drive cam 40 while the thrust bearing 161 receiving a load from the drive cam 40 in a thrust direction.

Each of the balls 3 is shaped in a spherical form and is made of, for example, metal. The balls 3 serve as rolling elements. Each of the balls 3 is rotatably installed in a corresponding one of the drive cam grooves 400 (see FIG. 2). Specifically, the number of the balls 3 is three.

Figure 3:
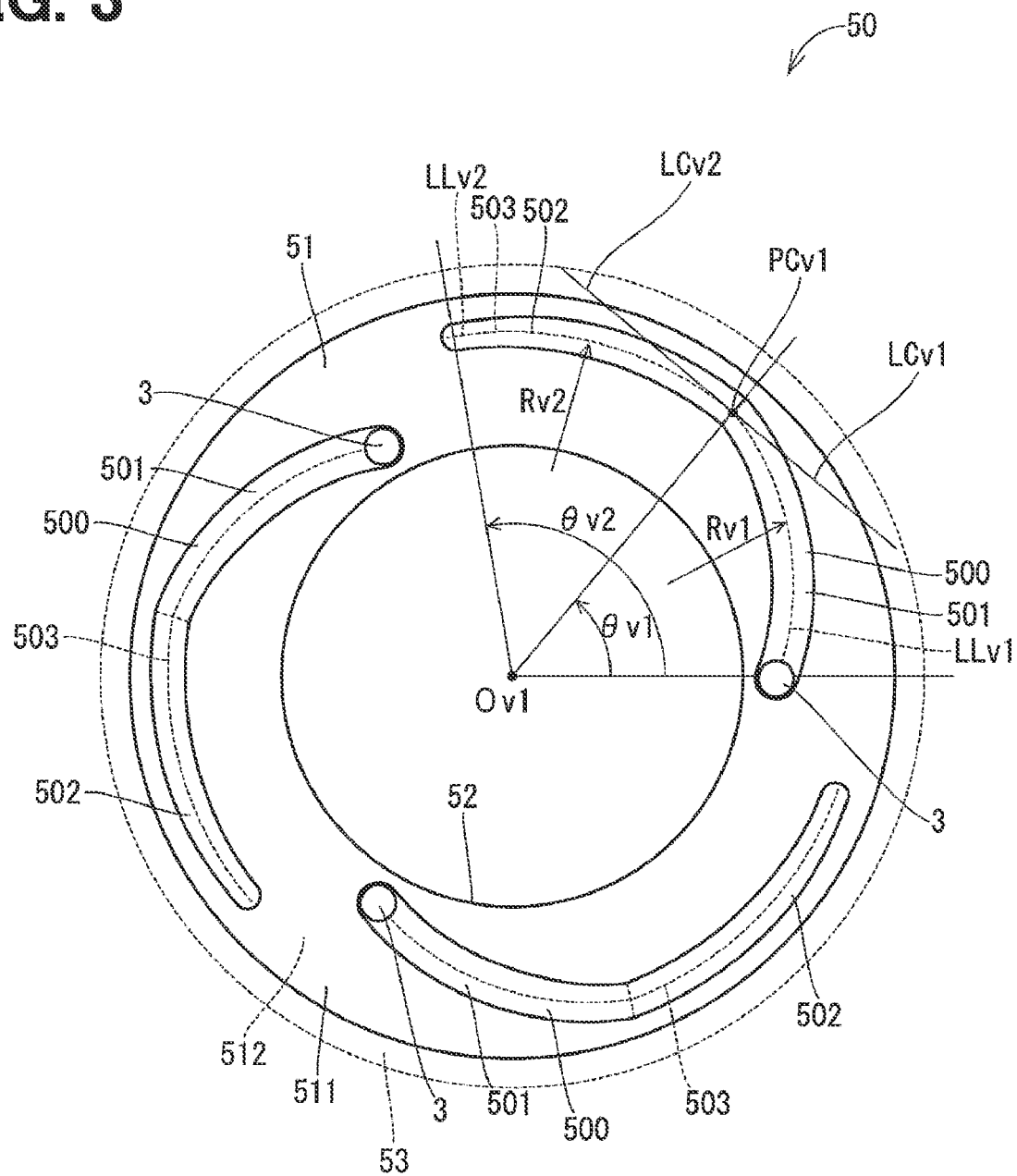
FIG. 3 is a diagram indicating a driven cam of the clutch device according to the first embodiment.

The driven cam 50 includes a driven cam main body 51, a driven cam hole 52, a plurality of spline coupling portions 53 and a plurality of driven cam grooves 500 (see FIG. 3). The driven cam main body 51 is shaped generally in a circular plate form and is made of, for example, metal. The driven cam hole 52 is shaped in a circular form and is coaxial with the driven cam main body 51 such that the driven cam hole 52 extends through a center of the driven cam main body 51. The spline coupling portions 53 are formed integrally with the driven cam main body 51 and are arranged at an outer peripheral part of the driven cam main body 51. The spline coupling portions 53 are arranged one after another in the circumferential direction of the driven cam main body 51 such that the spline coupling portions 53 extend from one end surface 511 of the driven cam main body 51 to the other end surface 512 of the driven cam main body 51.

The driven cam grooves 500 are recessed from the one end surface 511 of the driven cam main body 51 toward the other end surface 512 of the driven cam main body 51. The number of the driven cam grooves 500 formed at the driven cam main body 51 is three. At each of the driven cam grooves 500, a groove bottom 503 is sloped relative to the one end surface 511 of the driven cam 50 such that a depth of the groove bottom 503 continuously decreases from one end to the other end of the driven cam groove 500 in a circumferential direction of the driven cam 50. Details of the driven cam grooves 500 will be described later.

The driven cam 50 is placed at the inside of the outer tubular portion 125 of the housing 12 such that the spline coupling portions 53 of the driven cam 50 are spline-coupled to the spline grooves 126 of the housing 12. Therefore, the driven cam 50 is not rotatable relative to the housing 12 and is axially movable relative to the housing 12. The driven cam 50 is located on a side of the drive cam 40, which is opposite to the ring gear 33, such that each of the balls 3 is clamped between the corresponding driven cam groove 500 of the driven cam 50 and the corresponding drive cam groove 400 of the drive cam 40, and thereby the driven cam 50 cooperates with the drive cam 40 and the balls 3 to form the ball cam 2. The ball cam 2 serves as a rolling element cam. The drive cam 40 is rotatable relative to the driven cam 50 and the housing 12. When the drive cam 40 is rotated relative to the driven cam 50, each ball 3 is rolled along the groove bottom 403 of the corresponding drive cam groove 400 and the groove bottom 503 of the corresponding driven cam groove 500.

As described above, at each of the drive cam grooves 400, the groove bottom 403 is sloped from the one end to the other end of the drive cam groove 400 relative to the one end surface 411 of the drive cam 40. Furthermore, at each of the driven cam grooves 500, the groove bottom 503 is sloped from the one end to the other end of the driven cam groove 500 relative to the one end surface 511 of the driven cam 50. Therefore, when the drive cam 40 is rotated relative to the driven cam 50 by the torque outputted from the speed reducer 30, each ball 3 is rolled along the corresponding drive cam groove 400 and the corresponding driven cam groove 500, and thereby the driven cam 50 is moved in the axial direction relative to the drive cam 40 and the housing 12 (see (A) to (C) of FIG. 4).

As described above, the driven cam 50 has the driven cam grooves 500, which are formed at the one end surface 511 such that each ball 3 is clamped between the corresponding driven cam groove 500 and the corresponding drive cam groove 400, and the driven cam 50 cooperates with the drive cam 40 and the balls 3 to form the ball cam 2. Furthermore, when the relative rotation is made between the driven cam 50 and the drive cam 40, the driven cam 50 is moved in the axial direction relative to the drive cam 40.

The output shaft 62 includes a shaft portion 621, a plate portion 622, a tubular portion 623 and a friction plate 624. The shaft portion 621 is shaped generally in a cylindrical tubular form. The plate portion 622 is formed integrally with the shaft portion 621 in one-piece such that the plate portion 622 is shaped in a ring plate form and radially outwardly extends from one end of the shaft portion 621. The tubular portion 623 is formed integrally with the plate portion 622 in one-piece such that the tubular portion 623 is shaped generally in a cylindrical tubular form and extends from an outer peripheral part of the plate portion 622 toward a side that is opposite to the shaft portion 621. The friction plate 624 is shaped generally in a circular ring plate form and is installed to an end surface of the plate portion 622, which is located on a side where the tubular portion 623 is placed. Here, the friction plate 624 is not rotatable relative to the plate portion 622.

An end part of the input shaft 61 extends through the driven cam hole 52 and is located on a side of the driven cam 50, which is opposite to the drive cam 40. The output shaft 62 is coaxial with the input shaft 61 and is located on a side of the housing 12, which is opposite to the stationary flange 11, i.e., is located on a side of the driven cam 50, which is opposite to the drive cam 40. A bearing 142 is installed between an inner peripheral wall of the shaft portion 621 and an outer peripheral wall of the end part of the input shaft 61. Thereby, the output shaft 62 is rotatably supported by the input shaft 61 through the bearing 142.

The clutch 70 includes a plurality of inner friction plates 71 and a plurality of outer friction plates 72. Each of the inner friction plates 71 is shaped generally in a circular ring plate form, and these inner friction plates 71 are located between the input shaft 61 and the tubular portion 623 of the output shaft 62 such that the inner friction plates 71 are arranged one after another in the axial direction. The inner friction plates 71 are installed such that inner peripheral parts of the inner friction plates 71 are spline-coupled to the outer peripheral wall of the input shaft 61. Therefore, the inner friction plates 71 are not rotatable relative to the input shaft 61 and are axially movable relative to the input shaft 61.

Each of the outer friction plates 72 is shaped generally in a circular ring plate form, and these outer friction plates 72 are located between the input shaft 61 and the tubular portion 623 of the output shaft 62 such that the outer friction plates 72 are arranged one after another in the axial direction. The inner friction plates 71 and the outer friction plates 72 are alternately arranged in the axial direction of the input shaft 61. The outer friction plates 72 are installed such that outer peripheral parts of the outer friction plates 72 are spline-coupled to the inner peripheral wall of the tubular portion 623 of the output shaft 62. Therefore, the outer friction plates 72 are not rotatable relative to the output shaft 62 and are axially movable relative to the output shaft 62. One of the outer friction plates 72, which is closest to the friction plate 624 among the outer friction plates 72, can contact the friction plate 624.

In a coupled state where the inner friction plates 71 and the outer friction plates 72 contact with each other, i.e., are coupled with each other, a frictional force is generated between each inner friction plate 71 and the adjacent outer friction plate 72, and relative rotation between the inner friction plate 71 and the adjacent outer friction plate 72 is limited according to the amount of this frictional force. In a decoupled state where the inner friction plates 71 and the outer friction plates 72 are spaced from each other, i.e., are decoupled from each other, the frictional force is not generated between each inner friction plate 71 and the adjacent outer friction plate 72, and the relative rotation between the inner friction plate 71 and the adjacent outer friction plate 72 is not limited.

In the coupled state of the clutch 70, the torque, which is inputted to the input shaft 61, is transmitted to the output shaft 62 through the clutch 70. In contrast, in the decoupled state of the clutch 70, the torque, which is inputted to the input shaft 61, is not transmitted to the output shaft 62.

As described above, the torque is transmitted between the output shaft 62 and the input shaft 61. In the coupled state of the clutch 70, the clutch 70 enables the transmission of the torque between the input shaft 61 and the output shaft 62. In the decoupled state of the clutch 70, the clutch 70 disables the transmission of the torque between the input shaft 61 and the output shaft 62.

In the present embodiment, the clutch device 1 is a normally open type clutch device that is normally placed in the decoupled state.

The piston 81 is shaped generally in a circular ring form and is placed between the driven cam 50 and the clutch 70 at a location that is on a radially outer side of the input shaft 61. A thrust bearing 162 is installed between the driven cam 50 and the piston 81. The thrust bearing 162 rotatably supports the piston 81 while the thrust bearing 162 receives a load in a thrust direction from the piston 81.

A return spring 82 and a retaining portion 83 are placed between the piston 81 and the clutch 70. The retaining portion 83 is shaped generally in a circular ring form, and an outer peripheral part of the retaining portion 83 is fitted to an inner peripheral wall of the tubular portion 623 of the output shaft 62. The retaining portion 83 can retain the outer peripheral part of the one of the outer friction plates 72, which is closest to the piston 81 among the outer friction plates 72. Therefore, removal of the outer friction plates 72 and the inner friction plates 71 from the inside of the tubular portion 623 is limited. A distance between the retaining portion 83 and the friction plate 624 is larger than a sum of the plate thicknesses of the outer friction plates 72 and the inner friction plates 71.

The return spring 82 is a coned-disc spring, and the return spring 82 is installed such that one end of the return spring 82 contacts the outer peripheral part of the piston 81, and the other end of the return spring 82 contacts the retaining portion 83. Thereby, the return spring 82 urges the piston 81 toward the driven cam 50.

As shown in FIGS. 1, 2 and 3, in a state where each of the balls 3 is placed at the one end of the corresponding drive cam groove 400 and the one end of the corresponding driven cam groove 500, a distance between the drive cam 40 and the driven cam 50 is relatively small, and a gap Sp1 is formed between the piston 81 and the outer friction plate 72 of the clutch 70 (see FIG. 1). Therefore, the clutch 70 is in the decoupled state, and the transmission of the torque between the input shaft 61 and the output shaft 62 is disabled.

When the electric power is supplied to the coil 22 of the electric motor 20 through the control operation of the ECU 10, the electric motor 20 is rotated. Thereby, the torque is outputted from the speed reducer 30, and the drive cam 40 is rotated relative to the housing 12. Thus, each of the balls 3 is rolled from the one end of the corresponding drive cam groove 400 and the one end of the corresponding driven cam groove 500 toward the other end of the corresponding drive cam groove 400 and the other end of the corresponding driven cam groove 500. As a result, the driven cam 50 is axially moved relative to the drive cam 40, i.e., is moved toward the clutch 70. In this way, the piston 81 is urged by the driven cam 50 and is moved toward the clutch 70 against the urging force of the return spring 82.

When the piston 81 is urged by the driven cam 50 and is moved toward the clutch 70, the size of the gap Sp1 is reduced, and thereby the piston 81 contacts the outer friction plate 72 of the clutch 70. When the driven cam 50 further urges the piston 81 after the occurrence of the contact of the piston 81 to the clutch 70, the inner friction plates 71 and the outer friction plates 72 are coupled with each other. Thus, the clutch 70 is placed in the coupled state. Thereby, the transmission of the torque between the input shaft 61 and the output shaft 62 is enabled.

When the clutch transmission torque reaches a required clutch torque capacity, the ECU 10 stops the rotation of the electric motor 20. In this way, the clutch 70 is placed in a coupling holding state for holding the clutch transmission torque at the required clutch torque capacity. As described above, the piston 81 can receive the axial force from the driven cam 50 to shift the operational state of the clutch 70 to the coupled state or the decoupled state depending on the relative position of the driven cam 50 relative to the drive cam 40 in the axial direction.

An end part of the shaft portion 621 of the output shaft 62, which is opposite to the plate portion 622, is connected to an input shaft of the transmission (not shown) and is thereby rotatable integrally with the input shaft of the transmission. Specifically, the torque, which is outputted from the output shaft 62, is inputted to the input shaft of the transmission. When the torque is inputted to the input shaft of the transmission to cause rotation of the input shaft, a rotational speed of this rotation is changed at the transmission, and then this rotation is outputted to drive wheels of the vehicle to provide drive torque to the drive wheels. Thereby, the vehicle is driven.

Next, the drive cam grooves 400 will be described in detail.

As shown in FIG. 2, each of the drive cam grooves 400 has a first drive cam groove 401 and a second drive cam groove 402. The first drive cam groove 401 is formed such that a distance Rd1 between a center Od1 of the drive cam 40 and the groove bottom 403 at the first drive cam groove 401 continuously changes from the one end toward the other end of the drive cam groove 400. In the present embodiment, the first drive cam groove 401 is formed such that the distance Rd1 continuously increases from the one end toward the other end of the drive cam groove 400. Therefore, a locus LLd1 of the first drive cam groove 401 along the groove bottom 403 is in a form of a curved line.

The second drive cam groove 402 is connected to the first drive cam groove 401 and is formed such that a distance Rd2 between the center Od1 of the drive cam 40 and the groove bottom 403 at the second drive cam groove 402 is constant from the first drive cam groove 401 to the other end of the drive cam groove 400. Specifically, in the second drive cam groove 402, the distance Rd2 is constant regardless of a circumferential location of the drive cam 40. Therefore, a locus LLd2 of the second drive cam groove 402 along the groove bottom 403 is in a form of an arc.

As shown in FIG. 3, each of the driven cam grooves 500 has a first driven cam groove 501 and a second driven cam groove 502. The first driven cam groove 501 is formed such that a distance Rv1 between a center Ov1 of the driven cam 50 and the groove bottom 503 at the first driven cam groove 501 continuously changes from the one end toward the other end of the driven cam groove 500. In the present embodiment, the first driven cam groove 501 is formed such that the distance Rv1 continuously increases from the one end toward the other end of the driven cam groove 500. Therefore, a locus LLv1 of the first driven cam groove 501 along the groove bottom 503 is in a form of a curved line.

The second driven cam groove 502 is connected to the first driven cam groove 501 and is formed such that a distance Rv2 between the center Ov1 of the driven cam 50 and the groove bottom 503 at the second driven cam groove 502 is constant from the first driven cam groove 501 to the other end of the driven cam groove 500. Specifically, in the second driven cam groove 502, the distance Rv2 is constant regardless of a circumferential location of the driven cam 50. Therefore, a locus LLv2 of the second driven cam groove 502 along the groove bottom 503 is in a form of an arc.

As shown in FIG. 2, each of the drive cam grooves 400 is formed such that a tangent line LCd1 to the locus LLd1 of the first drive cam groove 401 at a point of connection PCd1 between the first drive cam groove 401 and the second drive cam groove 402 coincides with a tangent line LCd2 to the locus LLd2 of the second drive cam groove 402 at the point of connection PCd1 between the first drive cam groove 401 and the second drive cam groove 402.

As shown in FIG. 3, each of the driven cam grooves 500 is formed such that a tangent line LCv1 to the locus LLv1 of the first driven cam groove 501 at a point of connection PCv1 between the first driven cam groove 501 and the second driven cam groove 502 coincides with a tangent line LCv2 to the locus LLv2 of the second driven cam groove 502 at the point of connection PCv1 between the first driven cam groove 501 and the second driven cam groove 502.

As shown in FIGS. 2 and 3, each of the drive cam grooves 400 and each of the driven cam grooves 500 have an identical shape in a view taken from a side where the one end surface 411 of the drive cam 40 is placed or a side where the one end surface 511 of the driven cam 50 is placed. Thus, an angle θd1, which is circumferentially measured from the one end of the drive cam groove 400 to the second drive cam groove 402 about the center Od1 of the drive cam 40, is the same as an angle θv1, which is circumferentially measured from the one end of the driven cam groove 500 to the second driven cam groove 502 about the center Ov1 of the driven cam 50. Furthermore, an angle θd2, which is circumferentially measured from the one end to the other end of the drive cam groove 400 about the center Od1 of the drive cam 40, is the same as an angle θv2, which is circumferentially measured from the one end to the other end of the driven cam groove 500 about the center Ov1 of the driven cam 50.

As shown in FIG. 2, the drive cam grooves 400 do not intersect or connect with each other at the one end surface 411 of the drive cam 40.

As shown in FIG. 3, the driven cam grooves 500 do not intersect or connect with each other at the one end surface 511 of the driven cam 50.

Figure 4:
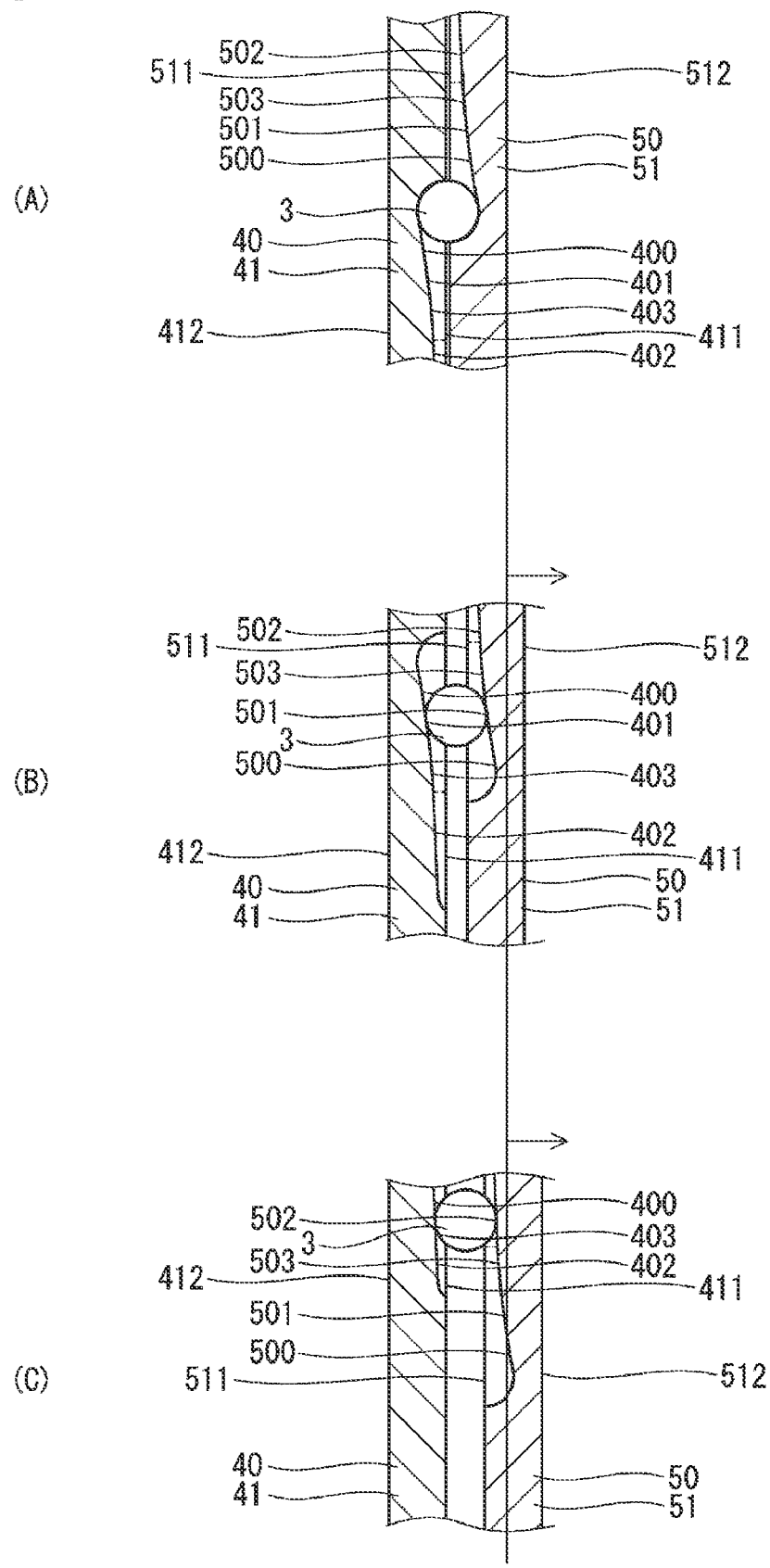
FIG. 4 is a diagram indicating operational states of a rolling element cam of the clutch device according to the first embodiment.

As shown in FIG. 4, the first drive cam groove 401 is formed such that a slope angle of the groove bottom 403 relative to the one end surface 411 of the drive cam 40 continuously decreases from the one end toward the second drive cam groove 402. In contrast, the second drive cam groove 402 is formed such that the slope angle of the groove bottom 403 relative to the one end surface 411 of the drive cam 40 is constant from the first drive cam groove 401 to the other end of the drive cam groove 400.

As shown in FIG. 4, the first driven cam groove 501 is formed such that a slope angle of the groove bottom 503 relative to the one end surface 511 of the driven cam 50 continuously decreases from the one end toward the second driven cam groove 502. In contrast, the second driven cam groove 502 is formed such that the slope angle of the groove bottom 503 relative to the one end surface 511 of the driven cam 50 is constant from the first driven cam groove 501 to the other end of the driven cam groove 500.

Figure 6:
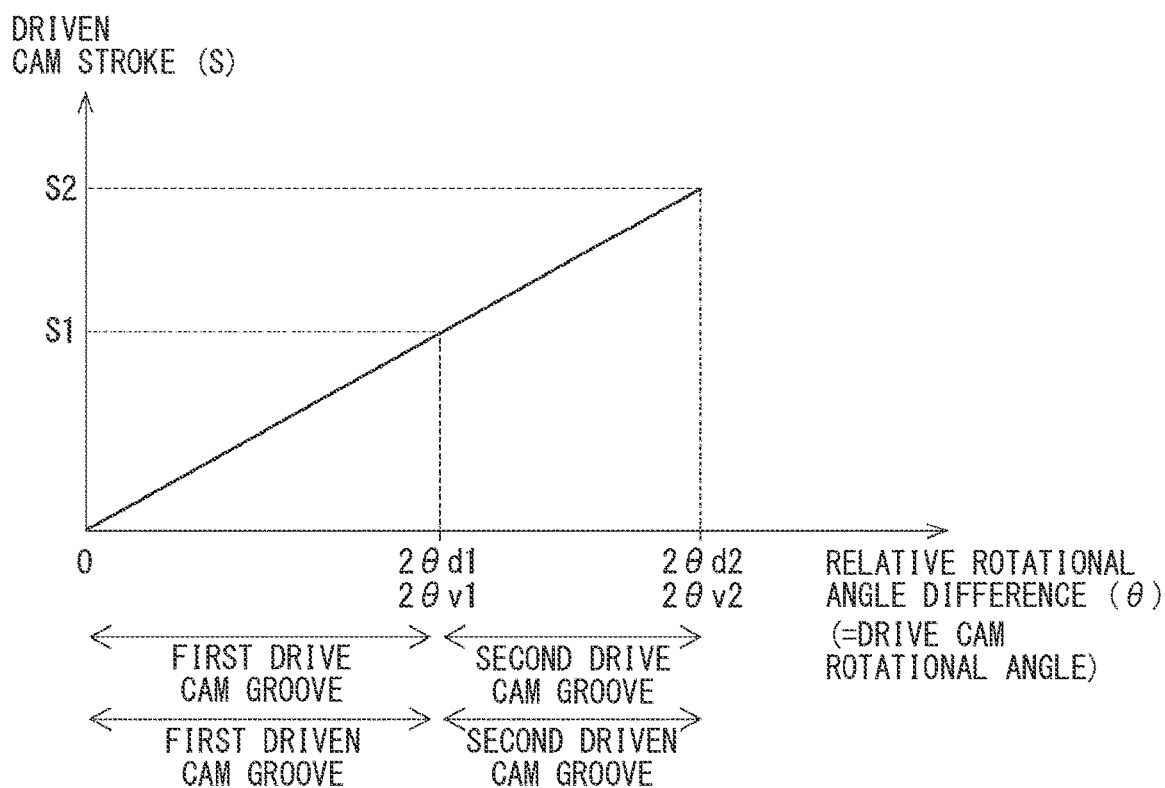
FIG. 6 is a diagram indicating a relationship between: a relative rotational angle difference between the drive cam and the driven cam of the clutch device; and the amount of displacement of the driven cam in an axial direction according to the first embodiment.

As shown in FIG. 6, in each of the drive cam grooves 400, the slope angle of the groove bottom 403 at the first drive cam groove 401 relative to the one end surface 411 of the drive cam 40 and the slope angle of the groove bottom 403 at the second drive cam groove 402 relative to the one end surface 411 of the drive cam 40 are set such that the amount of movement (S) of the driven cam 50 in the axial direction, i.e., the amount of stroke of the driven cam 50 relative to a relative rotational angle difference (8) between the drive cam 40 and the driven cam 50 linearly changes at a constant rate.

Similarly, in each of the driven cam grooves 500, the slope angle of the groove bottom 503 at the first driven cam groove 501 relative to the one end surface 511 of the driven cam 50 and the slope angle of the groove bottom 503 at the second driven cam groove 502 relative to the one end surface 511 of the driven cam 50 are set such that the amount of movement (S) of the driven cam 50 in the axial direction relative to the relative rotational angle difference (8) between the drive cam 40 and the driven cam 50 linearly changes at the constant rate.

As described above, the first drive cam groove 401 and the first driven cam groove 501 are formed such that the slope angle of the groove bottom 403 and the slope angle of the groove bottom 503 continuously change from the one end to the other end thereof, and the second drive cam groove 402 and the second driven cam groove 502 are formed such that the slope angle of the groove bottom 403 and the slope angle of the groove bottom 503 are constant from the one end to the other end thereof. However, as shown in FIG. 6, the drive cam groove 400 and the driven cam groove 500 are formed such that the amount of movement of the driven cam 50 in the axial direction relative to the relative rotational angle difference (8) between the drive cam 40 and the driven cam 50 linearly changes at the constant rate.

Next, the control operation of the electric motor 20 by the ECU 10 will be described. The ECU 10 is configured to execute a plurality of steps to control the operation of the electric motor 20. These steps include a first step, a second step, a third step and a fourth step described below.

In the first step, the ECU 10 operates the electric motor 20 such that the driven cam 50 is moved relative to the drive cam 40 in the axial direction until a reaction force, which is applied from the piston 81 to the driven cam 50, becomes equal to or larger than a predetermined value.

In the present embodiment, at a start time of the first step, the ball 3 is placed at the one end of the drive cam groove 400 and the one end of the driven cam groove 500, i.e., at the end of first drive cam groove 401, which is opposite to the second drive cam groove 402, and the end of the first driven cam groove 501, which is opposite to the second driven cam groove 502.

When the first step starts, the electric motor 20 is rotated, and the drive cam 40 is rotated relative to the driven cam 50. Thus, the driven cam 50 is moved, i.e., is stroked toward the clutch 70, and thereby the piston 81 is moved toward the clutch 70.

When the first step is further continued, the piston 81 contacts the clutch 70, and the reaction force, which is applied from the piston 81 to the driven cam 50, becomes equal to or larger than the predetermined value. When the reaction force, which is applied from the piston 81 to the driven cam 50, becomes equal to or larger than the predetermined value, the first step is terminated, and the operation proceeds to the second step. Specifically, when the reaction force, which is applied from the piston 81 to the driven cam 50, becomes equal to or larger than the predetermined value upon contact of the piston 81 to the clutch 70, it is an end time of the first step.

In the second step, which is executed after the first step, the electric motor 20 is operated such that the driven cam 50 is moved relative to the drive cam 40 in the axial direction while the reaction force, which is applied from the piston 81 to the driven cam 50, is kept equal to or larger than the predetermined value.

In the present embodiment, at a start time of the second step, the ball 3 is located in the first drive cam groove 401 and the first driven cam groove 501. More specifically, at the start time of the second step, the ball 3 is located between the one end and the other end of the first drive cam groove 401 and also between the one end and the other end of the first driven cam groove 501.

When the second step starts, the driven cam 50 is further moved toward the clutch 70, and the piston 81 urges the clutch 70. Thus, the operational state of the clutch 70 shifts from the decoupled state to the coupled state.

When the second step is further continued, the piston 81 further urges the clutch 70, and the clutch transmission torque reaches the required clutch torque capacity. When the clutch transmission torque reaches the required clutch torque capacity, the ECU 10 stops the rotation of the electric motor 20. When the ECU 10 stops the rotation of the electric motor 20 upon reaching of the clutch transmission torque to the required clutch torque capacity, it is an end time of the second step. After the end of the second step, the operational state of the clutch 70 becomes a coupling holding state where the clutch transmission torque is held at the required clutch torque capacity.

In the present embodiment, at the end time of the second step, the ball 3 is located between the one end and the other end of the second drive cam groove 402 and also between the one end and the other end of the second driven cam groove 502.

In each of the drive cam grooves 400, the slope angle of the groove bottom 403 relative to the one end surface 411 of the drive cam 40 is set such that the amount of movement of the driven cam 50 in the axial direction relative to the relative rotational angle difference between the drive cam 40 and the driven cam 50 in the first step is equal to the amount of movement of the driven cam 50 in the axial direction relative to the relative rotational angle difference between the drive cam 40 and the driven cam 50 in the second step.

In each of the driven cam grooves 500, the slope angle of the groove bottom 503 relative to the one end surface 511 of the driven cam 50 is set such that the amount of movement of the driven cam 50 in the axial direction relative to the relative rotational angle difference between the drive cam 40 and the driven cam 50 in the first step is equal to the amount of movement of the driven cam 50 in the axial direction relative to the relative rotational angle difference between the drive cam 40 and the driven cam 50 in the second step.

As discussed above, the operational state of the clutch 70 can be shifted from the decoupled state to the coupled state when the ECU 10 controls the operation of the electric motor 20 in the order of the first step and the second step.

In the third step, which is executed after the second step, the ECU 10 operates the electric motor 20 such that the driven cam 50 is moved relative to the drive cam 40 in the axial direction until the reaction force, which is applied from the piston 81 to the driven cam 50, becomes less than the predetermined value.

Specifically, the ECU 10 controls the operation of the electric motor 20 such that the electric motor 20 is rotated in an opposite direction that is opposite to the rotational direction of the electric motor 20 in the first step and the second step. When the third step starts, the electric motor 20 is rotated, and the drive cam 40 is rotated relative to the driven cam 50. Thus, the driven cam 50 is moved toward an opposite side that is opposite to the clutch 70, and the piston 81 is moved toward the drive cam 40.

When the third step is further continued, the piston 81 is moved away from the clutch 70, and the reaction force, which is applied from the piston 81 to the driven cam 50, becomes less than the predetermined value. When the reaction force, which is applied from the piston 81 to the driven cam 50, becomes less than the predetermined value, the third step is terminated, and the operation proceeds to the fourth step. Specifically, when the reaction force, which is applied from the piston 81 to the driven cam 50, becomes less than the predetermined value upon the movement of the piston 81 away from the clutch 70, it is an end time of the third step. The operational state of the clutch 70 is the decoupled state at the end time of the third step.

In the fourth step, which is executed after the third step, the electric motor 20 is operated such that the driven cam 50 is moved relative to the drive cam 40 in the axial direction while the reaction force, which is applied from the piston 81 to the driven cam 50, is kept less than the predetermined value.

By executing the fourth step, the relative rotation is made between the drive cam 40 and the driven cam 50, so that the ball 3 is moved toward the one end of the drive cam groove 400 and the one end of the driven cam groove 500. When the ball 3 is moved to the one end of the drive cam groove 400 and the one end of the driven cam groove 500, the ECU 10 stops the rotation of the electric motor 20. When the ECU 10 stops the rotation of the electric motor 20 upon the movement of the ball 3 to the one end of the drive cam groove 400 and the one end of the driven cam groove 500, it is an end time of the fourth step.

As discussed above, the operational state of the clutch 70 can be shifted from the coupled state to the decoupled state when the ECU 10 controls the operation of the electric motor 20 in the order of the third step and the fourth step.

Figure 7:
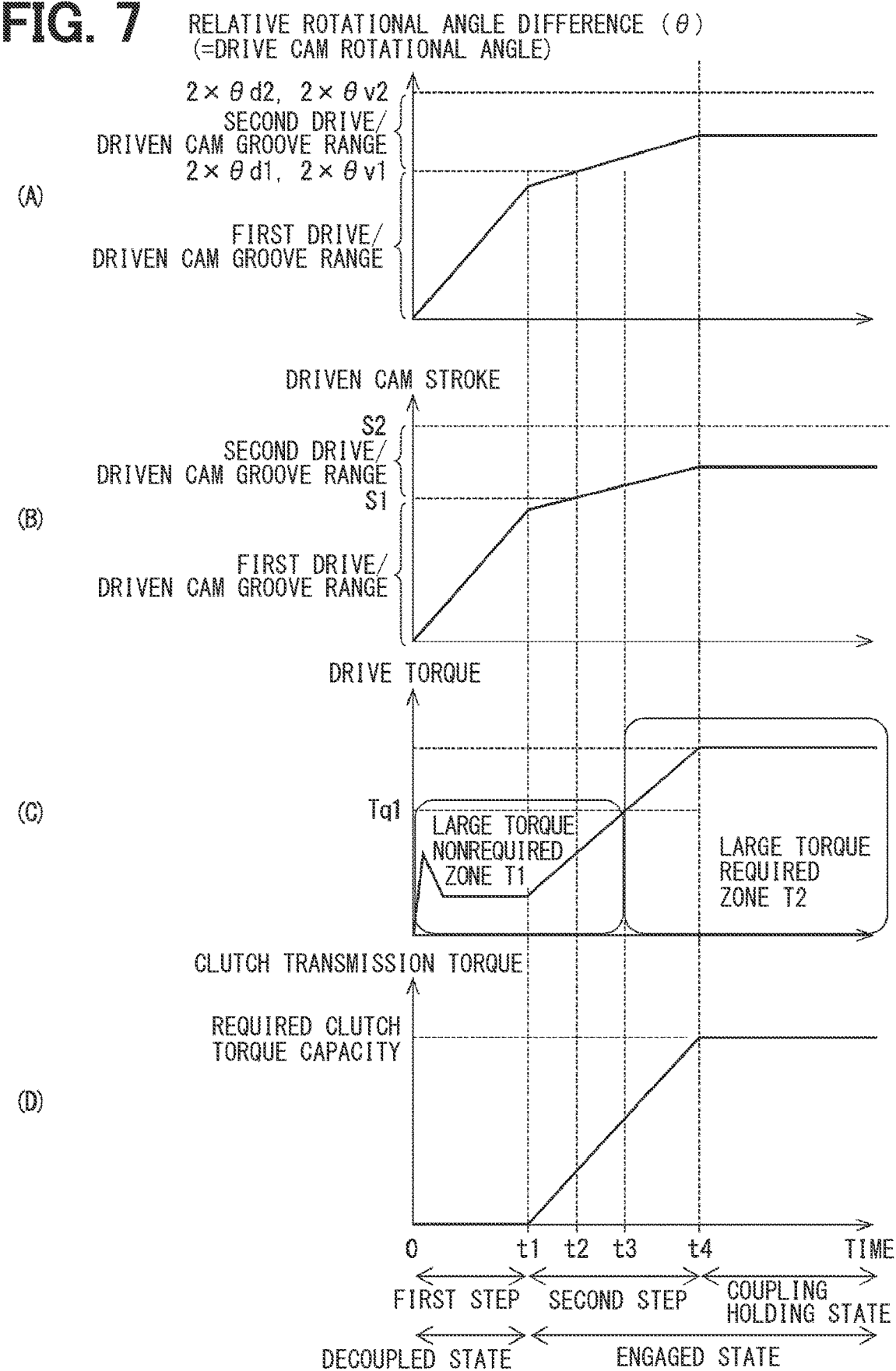
FIG. 7 is a diagram for describing an operation of the clutch device according to the first embodiment.

Next, the operation of the clutch device 1 according to the present embodiment will be described with reference to FIG. 7.

When the first step starts at time 0, the ECU 10 starts the rotation of the electric motor 20. Thus, after the time 0, the relative rotational angle difference between the drive cam 40 and the driven cam 50, i.e., the rotational angle of the drive cam 40 is increased (see FIG. 7(A)), and the amount of movement of the driven cam 50 in the axial direction, i.e., the amount of stroke of the driven cam 50 is increased (see FIG. 7(B).

Immediately after the start of the first step, although the drive torque of the electric motor 20 is temporarily increased, the drive torque of the electric motor 20 in the first step is relatively small (see FIG. 7(C)).

At the first step, the piston 81 is not in contact with the clutch 70, and thereby the clutch 70 is the decoupled state, so that clutch transmission torque is zero (see FIG. 7(D)).

When the piston 81 contacts the clutch 70 at time t1, the reaction force, which is applied from the piston 81 to the driven cam 50, becomes equal to or larger than the predetermined value. Thus, the first step is terminated, and the second step starts.

On or after the time t1, i.e., in the second step, the reaction force, which is applied from the piston 81 to the driven cam 50, becomes equal to or larger than the predetermined value, so that an increase rate of the relative rotational angle difference between the drive cam 40 and the driven cam 50 and an increase rate of the amount of movement of the driven cam 50 in the axial direction with time in the second step respectively become smaller than the increase rate of the relative rotational angle difference between the drive cam 40 and the driven cam 50 and the increase rate of the amount of movement of the driven cam 50 in the axial direction with time in the first step (see FIGS. 7(A) and (B)).

Furthermore, on or after the time t1, the drive torque of the electric motor 20 is increased (see FIG. 7(C)), and the clutch transmission torque is increased (see FIG. 7(D)). Thus, the torque is transmitted from the input shaft 61 to the output shaft 62 according to the clutch transmission torque.

At time t2, although the ball 3 is moved from the first drive cam groove 401 and the first driven cam groove 501 to the second drive cam groove 402 and the second driven cam groove 502, there is no change in the increase rate of the relative rotational angle difference between the drive cam 40 and the driven cam 50, the increase rate of the amount of movement of the driven cam 50 in the axial direction, the increase rate of the drive torque of the electric motor 20, and the increase rate of the clutch transmission torque before and after the time t2 (see FIG. 7(A) to (D)).

On or after time t3, the drive torque of the electric motor 20 becomes equal to or larger than a predetermined value Tq1. Specifically, on or after the time t3, the drive torque, which is required to the electric motor 20, becomes relatively large (see FIG. 7(C)). Here, a zone, in which the drive torque is increased from zero to the predetermined value Tq1 during the time 0 to the time t3, will be referred to as a large-torque nonrequired zone T1, and a zone, in which the drive torque is equal to or larger than the predetermined value Tq1 at or after the time t3, will be referred to as a large-torque required zone T2. In the present embodiment, the shifting from the large-torque nonrequired zone T1 to the large-torque required zone T2 takes place when the ball 3 is rolled in the second drive cam groove 402 and the second driven cam groove 502.

When the clutch transmission torque reaches the required clutch torque capacity at time t4, the ECU 10 stops the rotation of the electric motor 20. Thereby, the second step is terminated, and the relative rotational angle difference between the drive cam 40 and the driven cam 50, the amount of movement of the driven cam 50 in the axial direction (the location of the driven cam 50 in the axial direction), the drive torque of the electric motor 20, and the clutch transmission torque are kept constant on or after the time t4 (see FIG. 7(A) to (D)).

The operational state of the clutch 70 is the coupling holding state, in which the clutch transmission torque is maintained at the required clutch torque capacity, on or after the time t4.

In the coupling holding state of clutch 70, when the ECU 10 reverses the rotation of the electric motor 20 through the third step and the fourth step, the driven cam 50 is moved relative to the drive cam 40 toward the drive cam 40. Thus, the piston 81, which has urged the clutch 70, is moved toward the drive cam 40, and thereby the operational state of the clutch 70 shifts from the coupled state to the decoupled state. As a result, the transmission of the torque between the input shaft 61 and the output shaft 62 is disabled.

As described above, the clutch device 1 of the present embodiment includes:

the input shaft 61, which serves as the first transmitter; the electric motor 20, which serves as the drive device; the speed reducer 30; the drive cam 40; the balls 3; the driven cam 50; the output shaft 62, which serves as the second transmitter; the clutch 70; and the piston 81, which serves as the state shifter.

The electric motor 20 is configured to output the torque. The speed reducer 30 is configured to reduce the rotational speed of the rotation generated by the torque received from the electric motor 20 and output the torque of the rotation of the reduced rotational speed. The drive cam 40 has the drive cam grooves 400 formed at the one end surface 411 of the drive cam 40, and the drive cam 40 is configured to be rotated by the torque outputted from the speed reducer 30. Each of the balls 3 is rotatably installed in the corresponding one of the drive cam grooves 400. The driven cam 50 has the driven cam grooves 500, which are formed at the one end surface 511 such that each ball 3 is clamped between the corresponding driven cam groove 500 and the corresponding drive cam groove 400, and the driven cam 50 cooperates with the drive cam 40 and the balls 3 to form the ball cam 2. Furthermore, when the relative rotation is made between the driven cam 50 and the drive cam 40, the driven cam 50 is moved in the axial direction relative to the drive cam 40.

The torque is transmitted between the output shaft 62 and the input shaft 61. In the coupled state of the clutch 70, the clutch 70 enables the transmission of the torque between the input shaft 61 and the output shaft 62. In the decoupled state of the clutch 70, the clutch 70 disables the transmission of the torque between the input shaft 61 and the output shaft 62. The piston 81 can receive the axial force from the driven cam 50 to shift the operational state of the clutch 70 to the coupled state or the decoupled state depending on the relative position of the driven cam 50 relative to the drive cam 40 in the axial direction.

At each of the drive cam grooves 400, the groove bottom 403 is sloped relative to the one end surface 411 of the drive cam 40 such that the depth of the groove bottom 403 continuously decreases from the one end to the other end of the drive cam groove 400 in the circumferential direction of the drive cam 40. Each of the drive cam grooves 400 has the first drive cam groove 401 and the second drive cam groove 402. The first drive cam groove 401 is formed such that the distance Rd1 between the center Od1 of the drive cam 40 and the groove bottom 403 at the first drive cam groove 401 continuously changes from the one end toward the other end of the drive cam groove 400. The second drive cam groove 402 is connected to the first drive cam groove 401 and is formed such that the distance Rd2 between the center Od1 of the drive cam 40 and the groove bottom 403 at the second drive cam groove 402 is constant from the first drive cam groove 401 to the other end of the drive cam groove 400.

At each of the driven cam grooves 500, the groove bottom 503 is sloped relative to the one end surface 511 of the driven cam 50 such that the depth of the groove bottom 503 continuously decreases from the one end to the other end of the driven cam groove 500 in the circumferential direction of the driven cam 50. Each of the driven cam grooves 500 has the first driven cam groove 501 and the second driven cam groove 502. The first driven cam groove 501 is formed such that the distance Rv1 between the center Ov1 of the driven cam 50 and the groove bottom 503 at the first driven cam groove 501 continuously changes from the one end toward the other end of the driven cam groove 500. The second driven cam groove 502 is connected to the first driven cam groove 501 and is formed such that the distance Rv2 between the center Ov1 of the driven cam 50 and the groove bottom 503 at the second driven cam groove 502 is constant from the first driven cam groove 501 to the other end of the driven cam groove 500.

In the present embodiment, each of the second drive cam groove 402 and the second driven cam groove 502 is formed such that the distance Rd2, Rv2, which is measured between the center Od1, Ov1 of the drive cam 40 or the driven cam 50 and the second drive cam groove 402 or the second driven cam groove 502, is constant, and each of the first drive cam groove 401 and the first driven cam groove 501 is formed such that the distance Rd1, Rv1, which is measured between the center Od1, Ov1 of the drive cam 40 or the driven cam 50 and the first drive cam groove 401 or the first driven cam groove 501, continuously changes. Therefore, even when a length of the drive cam groove 400 measured in the circumferential direction of the drive cam 40 and a length of the driven cam groove 500 measured in the circumferential direction of the driven cam 50 are increased, it is possible to limit occurrence of connecting between each adjacent two of the drive cam grooves 400 and occurrence of connecting between each adjacent two of the driven cam grooves 500.

Thus, the length of each drive cam groove 400 measured in the circumferential direction of the drive cam 40 and the length of each driven cam groove 500 measured in the circumferential direction of the driven cam 50 can be easily increased. Thereby, the slope angle of the groove bottom 403 of the drive cam groove 400 and the slope angle of the groove bottom 503 of the driven cam groove 500 can be decreased while ensuring the required amount of axial movement of the driven cam 50 relative to the drive cam 40 relative to the relative rotational angle difference between the drive cam 40 and the driven cam 50. As a result, the required maximum torque of the electric motor 20 can be reduced, and the size of the electric motor 20 can be reduced. Thus, the size of the clutch device 1 can be further reduced.

In the present embodiment, each of the first drive cam groove 401 and the first driven cam groove 501 is formed such that the distance Rd1, Rv1 between the center Od1, Ov1 of the drive cam 40 or the driven cam 50 and the first drive cam groove 401 or the first driven cam groove 501, continuously changes. Therefore, in comparison to the configuration of the previously proposed technique, in which the distance Rd1, Rv1 is constant, the length of the first drive cam groove 401 and the length of the first driven cam groove 501 per unit angle about the center Od1, Ov1 can be increased. Thus, it is possible to decrease the slope angle of the groove bottom 403 at the drive cam groove 400 and the slope angle of the groove bottom 503 at the driven cam groove 500 by increasing the length of the drive cam groove 400 and the length of the driven cam groove 500. The present embodiment is advantageous over the configuration of the previously proposed technique in view of this point.

Furthermore, in the present embodiment, there is further provided the ECU 10, which serves as the controller that is configured to control the operation of the electric motor 20. The ECU 10 is configured to execute the plurality of steps to control the operation of the electric motor 20. These steps include the first step and the second step.

In the first step, the ECU 10 operates the electric motor 20 such that the driven cam 50 is moved relative to the drive cam 40 in the axial direction until the reaction force, which is applied from the piston 81 to the driven cam 50, becomes equal to or larger than the predetermined value.

In the second step, which is executed after the first step, the electric motor 20 is operated such that the driven cam 50 is moved relative to the drive cam 40 in the axial direction while the reaction force, which is applied from the piston 81 to the driven cam 50, is kept equal to or larger than the predetermined value.

The ECU 10 can shift the operational state of the clutch 70 from the decoupled state to the coupled state by executing the first step and the second step. Although the required drive torque of the electric motor 20 is relatively small in the initial stage of the first step, the required drive torque of the electric motor 20 becomes relatively large in the later stage of the second step. In the present embodiment, in the initial stage of the first step, in which the required drive torque of the electric motor 20 is small, the ball 3 may be rolled along the first drive cam groove 401 and the first driven cam groove 501, which have low efficiency, and in the later stage of the second step, in which the required drive torque of the electric motor 20 is large, the ball 3 may be rolled along the second drive cam groove 402 and the second driven cam groove 502, which have high efficiency. As a result, the required maximum torque of the electric motor 20 can be reduced, and the size of the electric motor 20 can be further reduced.

In the present embodiment, at the start time of the second step, the ball 3 is located in the first drive cam groove 401 and the first driven cam groove 501. Thus, it is possible to ensure the sufficient lengths of the drive cam groove 400 and the driven cam groove 500, which are used in the second step.

Furthermore, in the present embodiment, in each of the drive cam grooves 400, the slope angle of the groove bottom 403 relative to the one end surface 411 of the drive cam 40 is set such that the amount of movement of the driven cam 50 in the axial direction relative to the relative rotational angle difference between the drive cam 40 and the driven cam 50 in the first step is equal to the amount of movement of the driven cam 50 in the axial direction relative to the relative rotational angle difference between the drive cam 40 and the driven cam 50 in the second step.

Also, in each of the driven cam grooves 500, the slope angle of the groove bottom 503 relative to the one end surface 511 of the driven cam 50 is set such that the amount of movement of the driven cam 50 in the axial direction relative to the relative rotational angle difference between the drive cam 40 and the driven cam 50 in the first step is equal to the amount of movement of the driven cam 50 in the axial direction relative to the relative rotational angle difference between the drive cam 40 and the driven cam 50 in the second step.

Thus, regardless of which step is executed, the amount of change in the amount of rotation of the electric motor 20 and the amount of change in the amount of movement of the driven cam 50 in the axial direction become constant, and thereby the controllability of electric motor 20 and the clutch device 1 can be improved.

Furthermore, in the present embodiment, each of the drive cam grooves 400 is formed such that the tangent line LCd1 to the locus LLd1 of the first drive cam groove 401 at the point of connection PCd1 between the first drive cam groove 401 and the second drive cam groove 402 coincides with the tangent line LCd2 to the locus LLd2 of the second drive cam groove 402 at the point of connection PCd1 between the first drive cam groove 401 and the second drive cam groove 402.

Furthermore, each of the driven cam grooves 500 is formed such that the tangent line LCv1 to the locus LLv1 of the first driven cam groove 501 at the point of connection PCv1 between the first driven cam groove 501 and the second driven cam groove 502 coincides with the tangent line LCv2 to the locus LLv2 of the second driven cam groove 502 at the point of connection PCv1 between the first driven cam groove 501 and the second driven cam groove 502.

Therefore, when the ball 3 passes through the point of connection PCd1 between the first drive cam groove 401 and the second drive cam groove 402 and the point of connection PCv1 between the first driven cam groove 501 and the second driven cam groove 502, the ball 3 can be smoothly rolled. Thereby, it is possible to limit the decrease in the efficiency of the ball cam 2 and malfunction of the ball cam 2.

Furthermore, in the present embodiment, each drive cam groove 400 and each driven cam groove 500 have the identical shape in the view taken from the side where the one end surface 411 of the drive cam 40 is placed or the side where the one end surface 511 of the driven cam 50 is placed.

Therefore, in the state where the ball 3 is clamped between the drive cam groove 400 and the driven cam groove 500, the relative rotation between the drive cam 40 and the driven cam 50 can be smoothened. Thereby, it is possible to limit the decrease in the efficiency of the ball cam 2 and malfunction of the ball cam 2.

Furthermore, in the present embodiment, the drive cam grooves 400 do not intersect or connect with each other at the one end surface 411 of the drive cam 40.

Also, the driven cam grooves 500 do not intersect or connect with each other at the one end surface 511 of the driven cam 50.

Thereby, it is possible to limit the movement of the ball 3 to another one of the drive cam grooves 400 or another one of the driven cam grooves 500.

Second Embodiment

Figure 8:
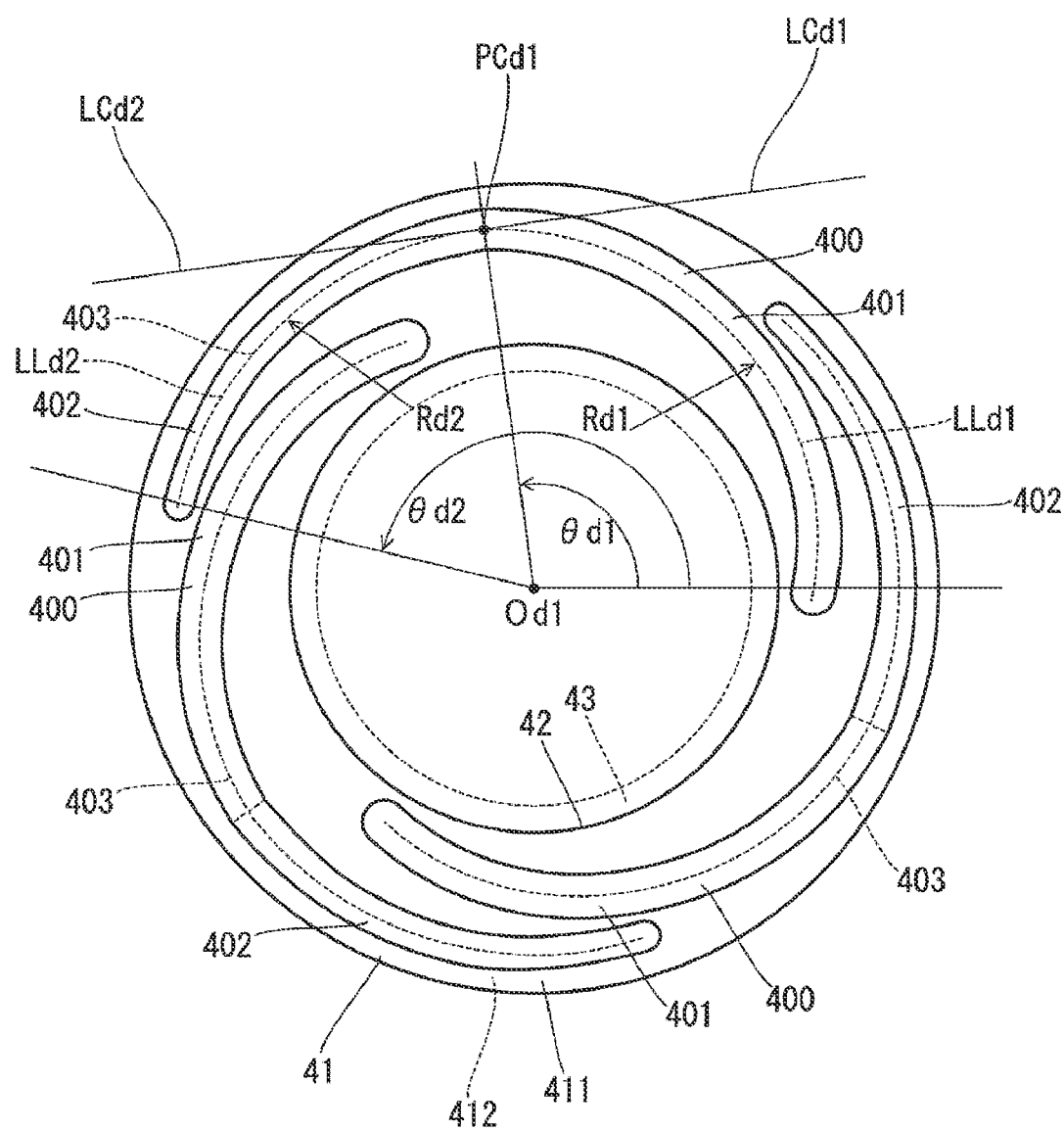
FIG. 8 is a diagram indicating a drive cam of a clutch device according to a second embodiment.

FIG. 8 indicates a portion of a clutch device according to a second embodiment. The second embodiment differs from the first embodiment with respect to the configurations of the respective drive cam grooves 400 and the respective driven cam grooves 500.

In the present embodiment, each adjacent two of the drive cam grooves 400 partially overlap with each other in a radial direction of the drive cam 40. Specifically, each adjacent two drive cam grooves 400 are formed such that the one end of the first drive cam groove 401 of one of the adjacent drive cam grooves 400 is located on an inner side of the second drive cam groove 402 of the other one of the adjacent drive cam grooves 400 in the radial direction of the drive cam 40 (see FIG. 8).

Furthermore, each adjacent two of the driven cam grooves 500 partially overlap with each other in a radial direction of the driven cam 50. Specifically, like the drive cam grooves 400, each adjacent two driven cam grooves 500 are formed such that the one end of the first driven cam groove 501 of one of the adjacent driven cam grooves 500 is located on an inner side of the second driven cam groove 502 of the other one of the adjacent driven cam grooves 500 in the radial direction of the driven cam 50 (not shown). Each of the drive cam grooves 400 and each of the driven cam grooves 500 have an identical shape in the view taken from the side where the one end surface 411 of the drive cam 40 is placed or the side where the one end surface 511 of the driven cam 50 is placed.

As described above, in the present embodiment, each adjacent two of the drive cam grooves 400 partially overlap with each other in the radial direction of the drive cam 40. Furthermore, each adjacent two of the driven cam grooves 500 partially overlap with each other in the radial direction of the driven cam 50. Thus, the length of each drive cam groove 400 measured in the circumferential direction of the drive cam 40 and the length of each driven cam groove 500 measured in the circumferential direction of the driven cam 50 can be further increased. Thereby, the slope angle of the groove bottom 403 of the drive cam groove 400 and the slope angle of the groove bottom 503 of the driven cam groove 500 can be further decreased while ensuring the required amount of axial movement of the driven cam 50 relative to the drive cam 40 relative to the relative rotational angle difference between the drive cam 40 and the driven cam 50. As a result, the required maximum torque of the electric motor 20 can be reduced, and the size of the electric motor 20 can be reduced. Thus, the size of the clutch device 1 can be further reduced.

Third Embodiment

Figure 9:
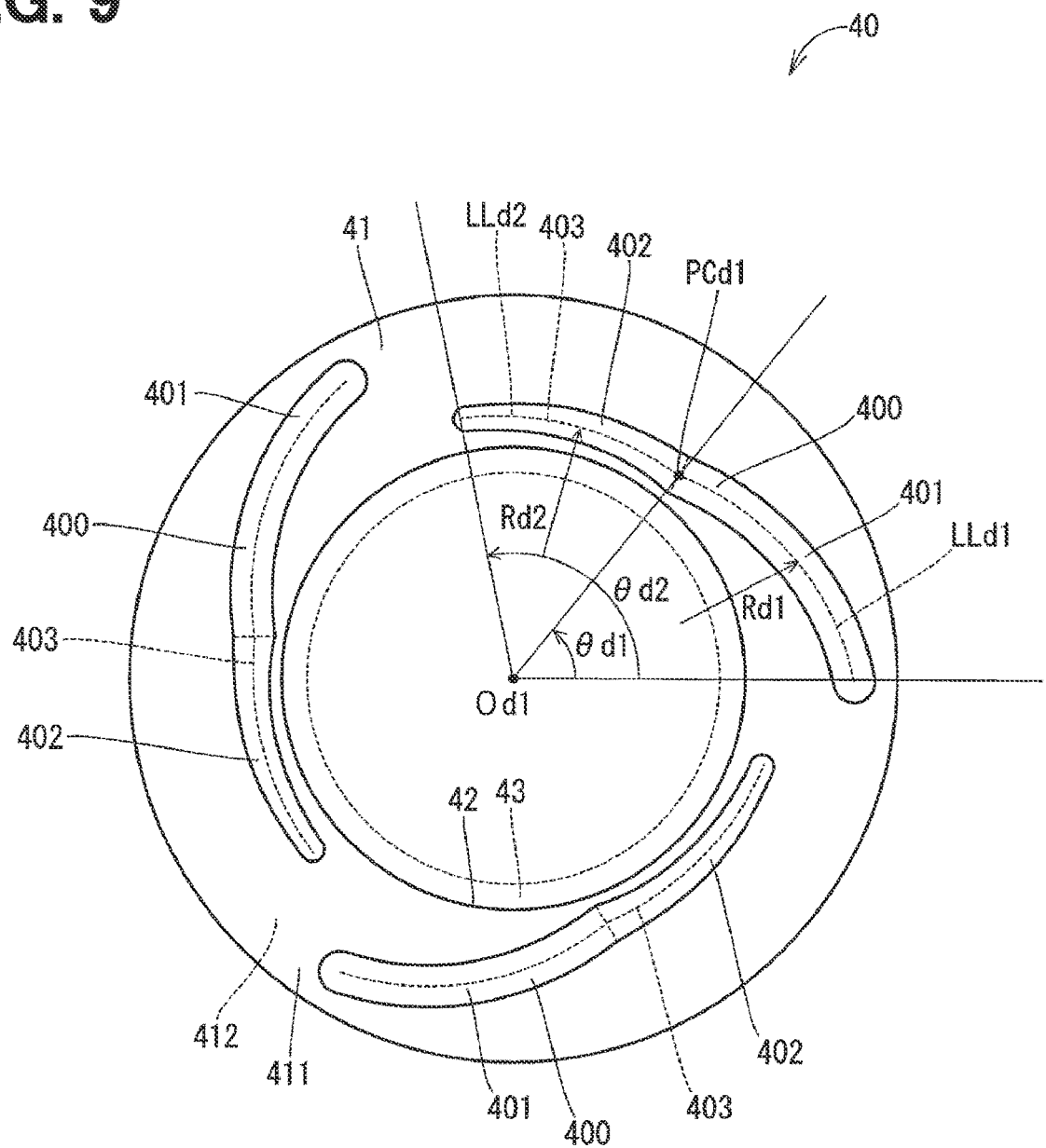
FIG. 9 is a diagram indicating a drive cam of a clutch device according to a third embodiment.

FIG. 9 indicates a portion of a clutch device according to a third embodiment. The third embodiment differs from the first embodiment with respect to the configurations of the respective drive cam grooves 400 and the respective driven cam grooves 500.

The first drive cam groove 401 is formed such that the distance Rd1 between the center Od1 of the drive cam 40 and the groove bottom 403 at the first drive cam groove 401 continuously changes from the one end toward the other end of the drive cam groove 400. In the present embodiment, the first drive cam groove 401 is formed such that the distance Rd1 continuously decreases from the one end toward the other end of the drive cam groove 400 (see FIG. 9). Therefore, the locus LLd1 of the first drive cam groove 401 along the groove bottom 403 is in a form of a curved line.

The second drive cam groove 402 is connected to the first drive cam groove 401 and is formed such that the distance Rd2 between the center Od1 of the drive cam 40 and the groove bottom 403 at the second drive cam groove 402 is constant from the first drive cam groove 401 to the other end of the drive cam groove 400 (see FIG. 9). Therefore, the locus LLd2 of the second drive cam groove 402 along the groove bottom 403 is in a form of an arc.

The first driven cam groove 501 is formed such that a distance Rv1 between a center Ov1 of the driven cam 50 and the groove bottom 503 at the first driven cam groove 501 continuously changes from one end toward the other end of the driven cam groove 500. In the present embodiment, the first driven cam groove 501 is formed such that the distance Rv1 continuously decreases from the one end toward the other end of the driven cam groove 500 (not shown). Therefore, the locus LLv1 of the first driven cam groove 501 along the groove bottom 503 is in the form of the curved line.

The second driven cam groove 502 is connected to the first driven cam groove 501 and is formed such that the distance Rv2 between the center Ov1 of the driven cam 50 and the groove bottom 503 at the second driven cam groove 502 is constant from the first driven cam groove 501 to the other end of the driven cam groove 500 (not shown). Therefore, the locus LLv2 of the second driven cam groove 502 along the groove bottom 503 is in a form of an arc.

Each of the drive cam grooves 400 and each of the driven cam grooves 500 have an identical shape in the view taken from the side where the one end surface 411 of the drive cam 40 is placed or the side where the one end surface 511 of the driven cam 50 is placed.

Fourth Embodiment

Figure 10:
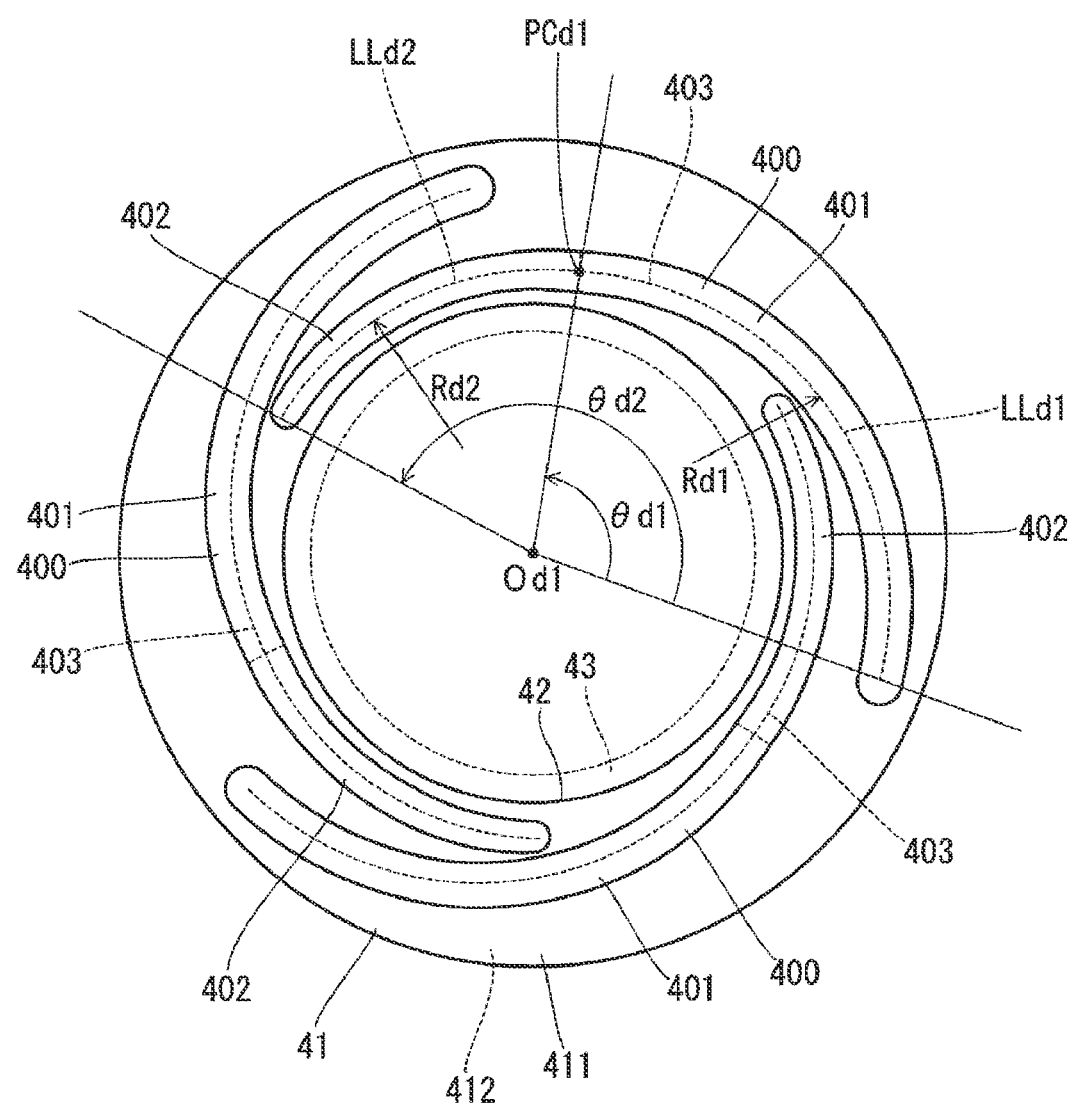
FIG. 10 is a diagram indicating a drive cam of a clutch device according to a fourth embodiment.

FIG. 10 indicates a portion of a clutch device according to a fourth embodiment. The fourth embodiment differs from the second and third embodiments with respect to the configurations of the respective drive cam grooves 400 and the respective driven cam grooves 500.

In the present embodiment, each adjacent two of the drive cam grooves 400 partially overlap with each other in the radial direction of the drive cam 40. Specifically, each adjacent two drive cam grooves 400 are formed such that the one end of the first drive cam groove 401 of one of the adjacent drive cam grooves 400 is located on an outer side of the second drive cam groove 402 of the other one of the adjacent drive cam grooves 400 in the radial direction of the drive cam 40 (see FIG. 10).

Furthermore, each adjacent two of the driven cam grooves 500 partially overlap with each other in the radial direction of the driven cam 50. Specifically, like the drive cam grooves 400, each adjacent two driven cam grooves 500 are formed such that the one end of the first driven cam groove 501 of one of the adjacent driven cam grooves 500 is located on an outer side of the second driven cam groove 502 of the other one of the adjacent driven cam grooves 500 in the radial direction of the driven cam 50 (not shown).

Each of the drive cam grooves 400 and each of the driven cam grooves 500 have an identical shape in the view taken from the side where the one end surface 411 of the drive cam 40 is placed or the side where the one end surface 511 of the driven cam 50 is placed.

In the present embodiment, like in the second embodiment, the length of each drive cam groove 400 measured in the circumferential direction of the drive cam 40 and the length of each driven cam groove 500 measured in the circumferential direction of the driven cam 50 can be increased.

Fifth Embodiment

Figure 11:
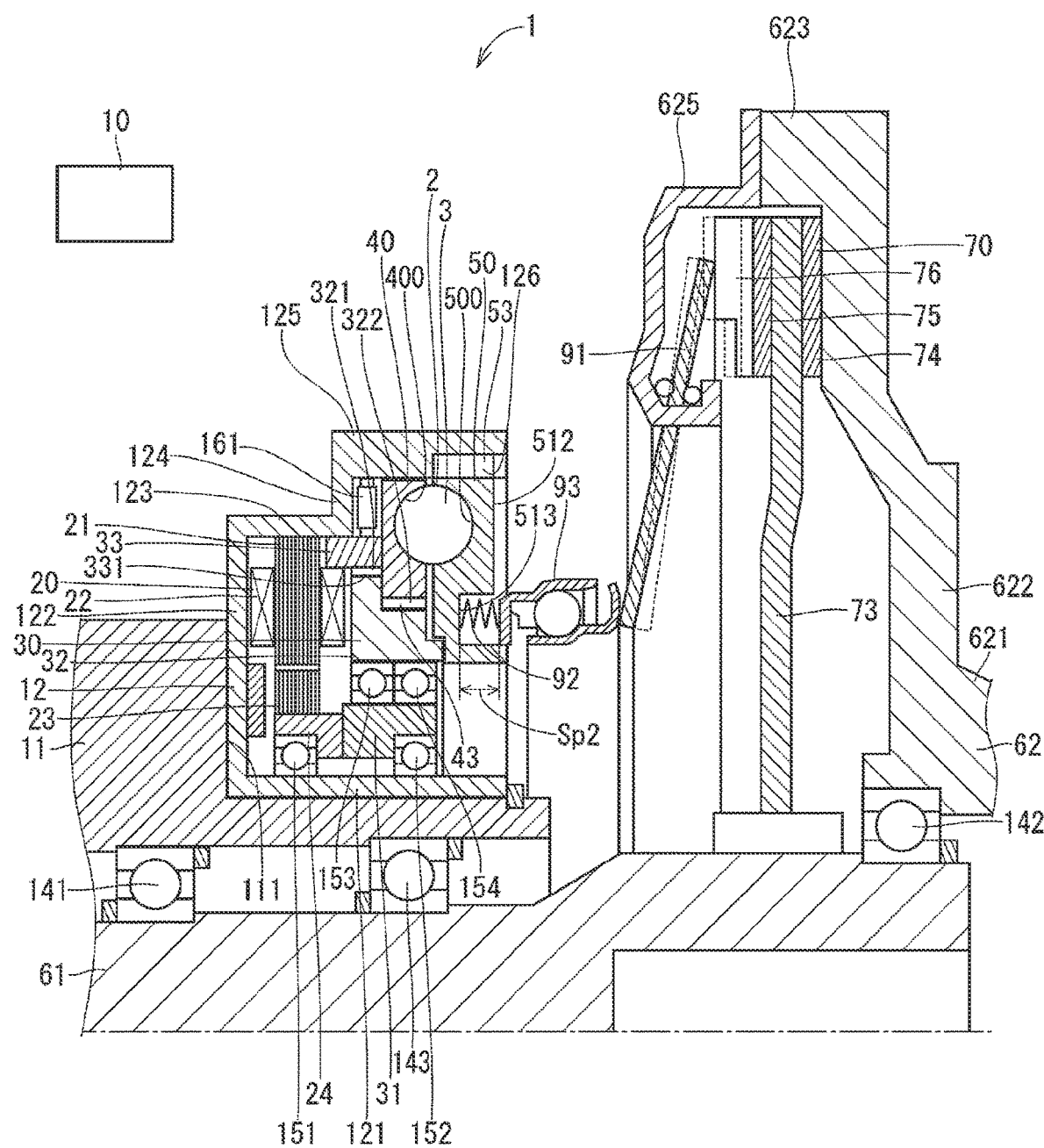
FIG. 11 is a cross-sectional view of a clutch device according to a fifth embodiment.

FIG. 11 indicates a clutch device according to a fifth embodiment. The fifth embodiment differs from the first embodiment with respect to the configurations of the clutch and the state shifter.

In the present embodiment, bearings 141, 143 are installed between the inner peripheral wall of the stationary flange 11 and the outer peripheral wall of the input shaft 61. Therefore, the input shaft 61 is rotatably supported by the stationary flange 11 through the bearings 141, 143.

The housing 12 is installed to the stationary flange 11 such that the inner peripheral wall of the inner tubular portion 121 is opposed to an outer peripheral wall of an end part of the stationary flange 11, and the inner bottom portion 122 contacts a stepped surface 111 of the stationary flange 11. The housing 12 is fixed to the stationary flange 11 by bolts (not shown). Here, the housing 12 is coaxial with the stationary flange 11 and the input shaft 61.

Like in the first embodiment, the electric motor 20, the speed reducer 30 and the ball cam 2 are placed at the inside of the outer tubular portions 123, 125 of the housing 12.

In the present embodiment, the output shaft 62 includes the shaft portion 621, the plate portion 622, the tubular portion 623 and a cover 625. The shaft portion 621 is shaped generally in the cylindrical tubular form. The plate portion 622 is formed integrally with the shaft portion 621 in one-piece such that the plate portion 622 is shaped in a ring plate form and radially outwardly extends from one end of the shaft portion 621. The tubular portion 623 is formed integrally with the plate portion 622 such that the tubular portion 623 is shaped generally in a cylindrical tubular form and extends from an outer peripheral part of the plate portion 622 toward a side that is opposite to the shaft portion 621. The output shaft 62 is rotatably supported by the input shaft 61 through the bearing 142.

The clutch 70 includes a support portion 73, friction plates 74, 75 and a pressure plate 76. The support portion 73 is located on a side of the plate portion 622 of the output shaft 62, at which the driven cam 50 is placed. The support portion 73 is shaped generally in a circular ring plate form and radially outwardly extends from an outer peripheral wall of an end part of the input shaft 61.

The friction plate 74 is shaped generally in a circular ring plate form and is installed to a side of an outer peripheral part of the support portion 73 where the plate portion 622 of the output shaft 62 is placed. The friction plate 74 is fixed to the support portion 73. The friction plate 74 can contact the plate portion 622 when the outer peripheral part of the support portion 73 is deformed toward the plate portion 622.

The friction plate 75 is shaped generally in a circular ring plate form and is installed to another side of the outer peripheral part of the support portion 73, which is opposite to the plate portion 622 of the output shaft 62. The friction plate 75 is fixed to the support portion 73.

The pressure plate 76 is shaped generally in a circular ring plate form and is located on a side of the friction plate 75 where the driven cam 50 is placed.

In a coupled state where the friction plate 74 and the plate portion 622 contact with each other, i.e., are coupled with each other, a frictional force is generated between the friction plate 74 and the plate portion 622, and relative rotation between the friction plate 74 and the plate portion 622 is limited according to the amount of this frictional force. In contrast, in a decoupled state where the friction plate 74 and the plate portion 622 are spaced from each other, i.e., are decoupled from each other, the frictional force is not generated between the friction plate 74 and the plate portion 622, and thereby relative rotation between the friction plate 74 and the plate portion 622 is not limited.

In the coupled state of the clutch 70, the torque, which is inputted to the input shaft 61, is transmitted to the output shaft 62 through the clutch 70. In contrast, in the decoupled state of the clutch 70, the torque, which is inputted to the input shaft 61, is not transmitted to the output shaft 62.

The cover 625 is shaped generally in a circular ring form and is installed to the tubular portion 623 of the output shaft 62 such that the cover 625 covers a side of the pressure plate 76, which is opposite to the friction plate 75.

In the present embodiment, the clutch device 1 includes a diaphragm spring 91, which serves as the state shifter, in place of the piston 81. The diaphragm spring 91 is shaped generally in a circular ring form and is installed to the cover 625 such that an outer peripheral part of the diaphragm spring 91 contacts the pressure plate 76. The outer peripheral part of the diaphragm spring 91 is located on a side of an inner peripheral part of the diaphragm spring 91 where the clutch 70 is placed, and an intermediate part of the diaphragm spring 91, which is located between the outer peripheral part and the inner peripheral part of the diaphragm spring 91, is supported by the cover 625. Furthermore, the diaphragm spring 91 urges the pressure plate 76 toward the friction plate 75 through the outer peripheral part of the diaphragm spring 91. Thus, the pressure plate 76 is urged against the friction plate 75, and the friction plate 74 is urged against the plate portion 622. Specifically, the clutch 70 is normally placed in the coupled state.

In the present embodiment, the clutch device 1 is a normally closed type clutch device that is normally placed in the coupled state.

In the present embodiment, a return spring 92 and a release bearing 93 are provided in place of the return spring 82, the retaining portion 83 and the thrust bearing 162.

The return spring 92 is, for example, a coil spring and is installed in a recess 513 that is shaped in an annular form and is recessed at a surface of the driven cam 50, which is opposite to the drive cam 40.

The release bearing 93 is placed between the return spring 92 and the inner peripheral part of the diaphragm spring 91. The return spring 92 urges the release bearing 93 toward the diaphragm spring 91. The release bearing 93 rotatably supports the diaphragm spring 91 while the release bearing 93 receives a load from the diaphragm spring 91 in a thrust direction. The urging force of the return spring 92 is smaller than the urging force of the diaphragm spring 91.

As shown in FIG. 11, in a state where each of the balls 3 is placed at the one end of the corresponding drive cam groove 400 and the one end of the corresponding driven cam groove 500, a distance between the drive cam 40 and the driven cam 50 is relatively small, and a gap Sp2 is formed between the release bearing 93 and a bottom of the recess 513 of the driven cam 50. Thus, the friction plate 74 is urged against the plate portion 622 by the urging force of the diaphragm spring 91, and the clutch 70 is placed in the coupled state so that the transmission of the torque between the input shaft 61 and the output shaft 62 is enabled.

When the electric power is supplied to the coil 22 of the electric motor 20 through the control operation of the ECU 10, the electric motor 20 is rotated. Thereby, the torque is outputted from the speed reducer 30, and the drive cam 40 is rotated relative to the housing 12. Thus, each of the balls 3 is rolled from the one end of the corresponding drive cam groove 400 and the one end of the corresponding driven cam groove 500 toward the other end of the corresponding drive cam groove 400 and the other end of the corresponding driven cam groove 500. As a result, the driven cam 50 is axially moved relative to the drive cam 40, i.e., is moved toward the clutch 70. Thereby, the gap Sp2 between the release bearing 93 and the recess 513 of the driven cam 50 is reduced, and the return spring 92 is compressed in the axial direction between the driven cam 50 and the release bearing 93.

When the driven cam 50 is further moved toward the clutch 70, the return spring 92 is compressed to its maximum amount, so that the release bearing 93 is urged toward the clutch 70 by the driven cam 50. Thus, the release bearing 93 urges the inner peripheral part of the diaphragm spring 91 and is moved toward the clutch 70 against a reaction force applied from the diaphragm spring 91.

When the release bearing 93 urges the inner peripheral part of the diaphragm spring 91 and is moved toward the clutch 70, the inner peripheral part of the diaphragm spring 91 is moved toward the clutch 70, and the outer peripheral part of the diaphragm spring 91 is moved toward the side that is opposite to the clutch 70. Thereby, the friction plate 74 is spaced away from the plate portion 622, and the operational state of the clutch 70 is changed from the coupled state to the decoupled state. As a result, the transmission of the torque between the input shaft 61 and the output shaft 62 is disabled.

When the clutch transmission torque becomes 0 (zero), the ECU 10 stops the rotation of the electric motor 20. Thus, the operational state of the clutch 70 is maintained in the decoupled state. As described above, the diaphragm spring 91 can receive the axial force from the driven cam 50 to change the operational state of the clutch 70 to the coupled state or the decoupled state according to the axial position of the driven cam 50 relative to the drive cam 40.

The configurations of each drive cam groove 400 and each driven cam groove 500 are the same as those of the first embodiment and are thereby not described for the sake of simplicity.

In the first step of the present embodiment, the ECU 10 operates the electric motor 20 such that the driven cam 50 is moved relative to the drive cam 40 in the axial direction until a reaction force, which is applied from the diaphragm spring 91 to the driven cam 50, becomes equal to or larger than a predetermined value.

When the first step starts, the electric motor 20 is rotated, and the drive cam 40 is rotated relative to the driven cam 50. Thus, the driven cam 50 is moved, i.e., is stroked toward the clutch 70, and thereby the driven cam 50 is moved toward the release bearing 93.

When the first step proceeds further, the return spring 92 is compressed to its maximum amount, so that the release bearing 93 is urged toward the clutch 70 by the driven cam 50. At this time, a reaction force, which is applied from the diaphragm spring 91 to the driven cam 50, becomes equal to or larger than a predetermined value. When the reaction force, which is applied from the diaphragm spring 91 to the driven cam 50, becomes equal to or larger than the predetermined value, the first step is terminated, and the operation proceeds to the second step. Specifically, when the reaction force, which is applied from the diaphragm spring 91 to the driven cam 50, becomes equal to or larger than the predetermined value upon compressing the return spring 92 to its maximum amount, it is the end of the first step.

In the second step, which is executed after the first step, the electric motor 20 is operated such that the driven cam 50 is moved relative to the drive cam 40 in the axial direction while the reaction force, which is applied from the diaphragm spring 91 to the driven cam 50, is kept equal to or larger than the predetermined value.

As described above, the present disclosure can be applied to the normally closed type clutch device.

Sixth Embodiment

Figure 12:
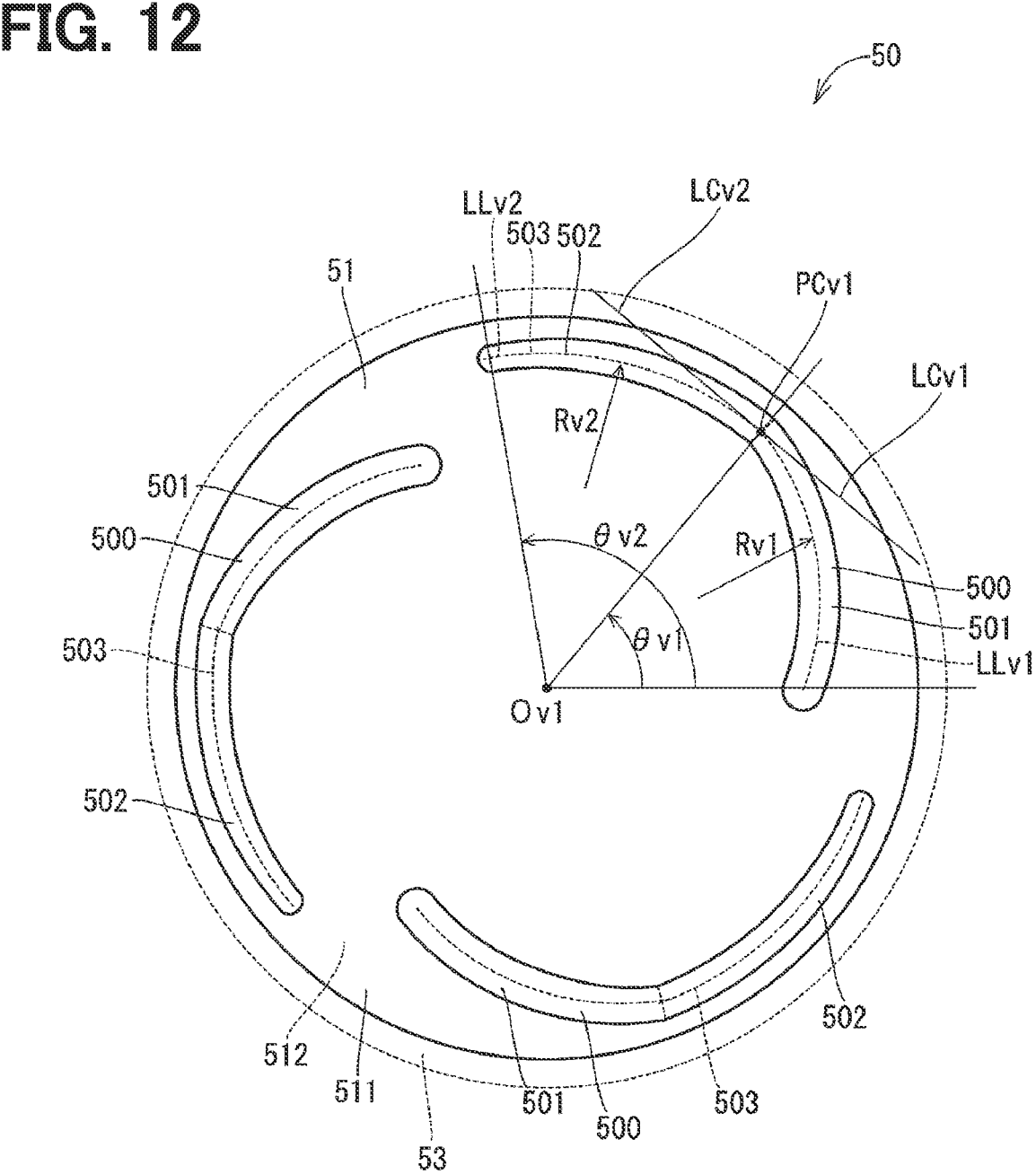
FIG. 12 is a diagram indicating a driven cam of a clutch device according to a sixth embodiment.

FIG. 12 indicates a portion of a clutch device according to a sixth embodiment. The sixth embodiment differs from the first embodiment with respect to the configurations of the driven cam 50.

In the present embodiment, the driven cam 50 does not have the driven cam hole 52. Specifically, the end part of the input shaft 61 is located on a side of the driven cam 50 that is opposite to the output shaft 62.

When the relative rotation is made between the drive cam 40 and the driven cam 50, the driven cam 50 is moved toward the clutch 70. Thus, the piston 81 is urged against the clutch 70, and thereby the operational state of the clutch 70 shifts from the decoupled state to the coupled state. Therefore, the torque, which is inputted to the input shaft 61, is transmitted to the output shaft 62 through the clutch 70.

OTHER EMBODIMENTS

In the above embodiments, at the start time of the second step, the ball 3 is located in the first drive cam groove 401 and the first driven cam groove 501. Alternatively, in another embodiment, the ball 3 may be located in the second drive cam groove 402 and the second driven cam groove 502 at the start time of the second step. For example, at the start time of the second step, the ball 3 may be located at the one end of the second drive cam groove 402 and the one end of the second driven cam groove 502, i.e., at the end of the second drive cam groove 402, which is located on the side where the first drive cam groove 401 is placed, and the end of the second driven cam groove 502, which is located on the side where the first driven cam groove 501 is placed. Alternatively, the ball 3 may be located between the one end and the other end of the second drive cam groove 402 and between the one end and the other end of the second driven cam groove 502.

In the above embodiments, the slope angle of the groove bottom 403 at the first drive cam groove 401 is different from the slope angle of the groove bottom 403 at the second drive cam groove 402, and the slope angle of the groove bottom 503 at the first driven cam groove 501 is different from the slope angle of the groove bottom 503 at the second driven cam groove 502. Alternatively, in another embodiment, the slope angle of the groove bottom 403 at the first drive cam groove 401 may be the same as the slope angle of the groove bottom 403 at the second drive cam groove 402, and the slope angle of the groove bottom 503 at the first driven cam groove 501 may be the same as the slope angle of the groove bottom 503 at the second driven cam groove 502.

Furthermore, in another embodiment, in each of the drive cam grooves 400, the slope angle of the groove bottom 403 relative to the one end surface 411 of the drive cam 40 may be set such that the amount of movement of the driven cam 50 in the axial direction relative to the relative rotational angle difference between the drive cam 40 and the driven cam 50 in the first step is different from the amount of movement of the driven cam 50 in the axial direction relative to the relative rotational angle difference between the drive cam 40 and the driven cam 50 in the second step. Furthermore, in each of the driven cam grooves 500, the slope angle of the groove bottom 503 relative to the one end surface 511 of the driven cam 50 may be set such that the amount of movement of the driven cam 50 in the axial direction relative to the relative rotational angle difference between the drive cam 40 and the driven cam 50 in the first step is different from the amount of movement of the driven cam 50 in the axial direction relative to the relative rotational angle difference between the drive cam 40 and the driven cam 50 in the second step.

Furthermore, in the first embodiment, each of the drive cam grooves 400 is formed such that the tangent line LCd1 to the locus LLd1 of the first drive cam groove 401 at the point of connection PCd1 between the first drive cam groove 401 and the second drive cam groove 402 coincides with the tangent line LCd2 to the locus LLd2 of the second drive cam groove 402 at the point of connection PCd1 between the first drive cam groove 401 and the second drive cam groove 402, and each of the driven cam grooves 500 is formed such that the tangent line LCv1 to the locus LLv1 of the first driven cam groove 501 at the point of connection PCv1 between the first driven cam groove 501 and the second driven cam groove 502 coincides with the tangent line LCv2 to the locus LLv2 of the second driven cam groove 502 at the point of connection PCv1 between the first driven cam groove 501 and the second driven cam groove 502. Alternatively, in another embodiment, each of the drive cam grooves 400 may be formed such that the tangent line LCd1 at the point of connection PCd1 does not coincide with the tangent line LCd2 at the point of connection PCd1. Furthermore, each of the driven cam grooves 500 may be formed such that the tangent line LCv1 at the point of connection PCv1 does not coincide with the tangent line LCv2 at the point of connection PCv1.

Furthermore, in another embodiment, the number of the drive cam grooves 400 and the number of the driven cam grooves 500 are not necessarily limited to three and may be changed to four or more. Furthermore, the number of the balls 3 is not necessarily limited to three and may be changed to four or more according to the number of the drive cam grooves 400 and the number of the driven cam grooves 500.

Furthermore, in the above embodiments, there is described the example where the ball 3, which is shaped in the spherical form, is used as the rolling element placed between the drive cam 40 and the driven cam 50. Alternatively, in another embodiment, the rolling element is not necessarily limited to the spherical form, and a roller, which is shaped in a cylindrical form, may be used as the rolling element.

Furthermore, in another embodiment, the electric motor 20 and the speed reducer 30 may be placed at the outside of the housing 12 as long the electric motor 20 and the speed reducer 30 can output the torque to the drive cam 40. As long as the speed reducer 30 can reduce the rotational speed of the rotation generated by the received torque and output the torque of the rotation of the reduced rotational speed, the speed reducer 30 is not necessarily limited to have the structure that includes the eccentric portion 31, the planetary gear 32 and the ring gear 33, and the speed reducer 30 may have any other suitable structure.

Furthermore, in the above embodiments, the drive device (the electric motor 20), which outputs the torque to the speed reducer, is shaped in the ring form, and the first transmitter (the input shaft 61) is placed on the inner side of the drive device. Alternatively, in another embodiment, the drive device may not be shaped in the ring form. In such a case, the first transmitter may be placed at the outer side of the drive device. Furthermore, the drive device may be placed on the radially outer side of the first transmitter at the outside of the housing. Furthermore, in another embodiment, the drive device is not necessarily limited to the electric motor and may be another type of device as long as the drive device can output the torque.

Furthermore, the present disclosure is not necessarily applied to the vehicle driven by the drive torque generated from the internal combustion engine and may be applied to an electric vehicle or a hybrid vehicle that can travel with drive torque generated from an electric motor.

Furthermore, in another embodiment, the torque may be inputted from the second transmitter, and the torque may be outputted from the first transmitter through the clutch. Furthermore, in a case where one of the first transmitter and the second transmitter is non-rotatably fixed, rotation of the other one of the first transmitter and the second transmitter can be stopped by placing the clutch in the coupled state. In such a case, the clutch device may be used as a brake device.

As described above, the present disclosure is not necessarily limited to the above-described embodiments and may be implemented in various forms without departing from the gist thereof.

The present disclosure has been described based on the embodiments. However, the present disclosure is not necessarily limited to the embodiments and structures described therein. The present disclosure also covers various modifications of the above embodiments and modifications within an equivalent range. Further, various combinations and forms, and other combinations and forms including only one element, more, or less than them are also within the scope and spirit of the present disclosure.

What is claimed is:

1. A clutch device comprising:
   a first transmitter;
   a drive device that is configured to output torque;
   a speed reducer that is configured to reduce a rotational speed of rotation generated by the torque received from the drive device and output the torque of the rotation of the reduced rotational speed;
   a drive cam that has a plurality of drive cam grooves formed at one end surface of the drive cam, wherein the drive cam is configured to be rotated by the torque outputted from the speed reducer;
   a plurality of rolling elements that are rotatably installed in the plurality of drive cam grooves, respectively;
   a driven cam that has a plurality of driven cam grooves formed at one end surface of the driven cam while each of the plurality of rolling elements is clamped between a corresponding one of the plurality of drive cam grooves and a corresponding one of the plurality of driven cam grooves, wherein the driven cam cooperates with the drive cam and the plurality of rolling elements to form a rolling element cam, and when relative rotation is made between the driven cam and the drive cam, the driven cam is moved in an axial direction relative to the drive cam;

a second transmitter that is configured to transmit the torque between the first transmitter and the second transmitter;

a clutch that is configured to enable transmission of the torque between the first transmitter and the second transmitter in a coupled state of the clutch and disable the transmission of the torque between the first transmitter and the second transmitter in a decoupled state of the clutch; and a state shifter that is configured to receive a force from the driven cam in the axial direction and shift an operational state of the clutch between the coupled state and the decoupled state depending on a relative position of the driven cam relative to the drive cam in the axial direction, wherein:

in each of the plurality of drive cam grooves, a groove bottom is sloped relative to the one end surface of the drive cam such that a depth of the groove bottom continuously decreases from one end to another end of the drive cam groove in a circumferential direction of the drive cam while each of the plurality of drive cam grooves has:

a first drive cam groove that is formed such that a distance between a center of the drive cam and the groove bottom at the first drive cam groove continuously changes from the one end toward the another end of the drive cam groove; and a second drive cam groove that is connected to the first drive cam groove and is formed such that a distance between the center of the drive cam and the groove bottom at the second drive cam groove is constant from the first drive cam groove to the another end of the drive cam groove;

in each of the plurality of driven cam grooves, a groove bottom is sloped relative to the one end surface of the driven cam such that a depth of the groove bottom continuously decreases from one end to another end of the driven cam groove in a circumferential direction of the driven cam while each of the plurality of driven cam grooves has:

a first driven cam groove that is formed such that a distance between a center of the driven cam and the groove bottom at the first driven cam groove continuously changes from the one end toward the another end of the driven cam groove; and a second driven cam groove that is connected to the first driven cam groove and is formed such that a distance between the center of the driven cam and the groove bottom at the second driven cam groove is constant from the first driven cam groove to the another end of the driven cam groove;

each adjacent two of the plurality of drive cam grooves partially overlap with each other in a radial direction of the drive cam while a boundary between the first drive cam groove and the second drive cam groove of one of the adjacent two of the plurality of drive cam grooves is offset from another one of the adjacent two of the plurality of drive cam grooves in the circumferential direction of the drive cam; and each adjacent two of the plurality of driven cam grooves partially overlap with each other in a radial direction of the driven cam while a boundary between the first driven cam groove and the second driven cam groove of one of the adjacent two of the plurality of driven cam grooves is offset from another one of the adjacent two of the plurality of driven cam grooves in the circumferential direction of the driven cam.

2. The clutch device according to claim 1, further comprising a controller that is configured to control an operation of the drive device, wherein:

the controller is configured to execute a plurality of steps to control the operation of the drive device;

the plurality of steps includes:

a first step of operating the drive device such that the driven cam is moved relative to the drive cam in the axial direction until a reaction force, which is applied from the state shifter to the driven cam, becomes equal to or larger than a predetermined value; and a second step of operating the drive device such that the driven cam is moved relative to the drive cam in the axial direction while the reaction force, which is applied from the state shifter to the driven cam, is kept equal to or larger than the predetermined value after the first step.

3. The clutch device according to claim 2, wherein each of the plurality of rolling elements is placed in the first drive cam groove of the corresponding one of the plurality of drive cam grooves and the first driven cam groove of the corresponding one of the plurality of driven cam grooves at a start time of the second step.

4. The clutch device according to claim 2, wherein each of the plurality of rolling elements is placed in the second drive cam groove of the corresponding one of the plurality of drive cam grooves and the second driven cam groove of the corresponding one of the plurality of driven cam grooves at a start time of the second step.

5. The clutch device according to claim 2, wherein:

in each of the plurality of drive cam grooves, a slope angle of the groove bottom relative to the one end surface of the drive cam is set such that an amount of movement of the driven cam in the axial direction relative to a relative rotational angle difference between the drive cam and the driven cam in the first step is equal to an amount of movement of the driven cam in the axial direction relative to a relative rotational angle difference between the drive cam and the driven cam in the second step; and in each of the plurality of driven cam grooves, a slope angle of the groove bottom relative to the one end surface of the driven cam is set such that the amount of movement of the driven cam in the axial direction relative to the relative rotational angle difference between the drive cam and the driven cam in the first step is equal to the amount of movement of the driven cam in the axial direction relative to the relative rotational angle difference between the drive cam and the driven cam in the second step.

6. The clutch device according to claim 1, wherein:

each of the plurality of drive cam grooves is formed such that a tangent line to a locus of the first drive cam groove at a point of connection between the first drive cam groove and the second drive cam groove coincides with a tangent line to a locus of the second drive cam groove at the point of connection between the first drive cam groove and the second drive cam groove; and each of the plurality of driven cam grooves is formed such that a tangent line to a locus of the first driven cam groove at a point of connection between the first driven cam groove and the second driven cam groove coincides with a tangent line to a locus of the second driven cam groove at the point of connection between the first driven cam groove and the second driven cam groove.

7. The clutch device according to claim 1, wherein a shape of each of the plurality of drive cam grooves, which is viewed in the axial direction from one axial side where the driven cam is placed, is the same as a shape of each of the plurality of driven cam grooves, which is viewed in the axial direction from an opposite axial side where the drive cam is placed.

8. The clutch device according to claim 1, wherein:
the plurality of drive cam grooves do not intersect or connect with each other at the one end surface of the drive cam; and
the plurality of driven cam grooves do not intersect or connect with each other at the one end surface of the driven cam.

9. A clutch device comprising:
a first transmitter;
a drive device that is configured to output torque;
a speed reducer that is configured to reduce a rotational speed of rotation generated by the torque received from the drive device and output the torque of the rotation of the reduced rotational speed;
a drive cam that has a plurality of drive cam grooves formed at one end surface of the drive cam, wherein the drive cam is configured to be rotated by the torque outputted from the speed reducer;
a plurality of rolling elements that are rotatably installed in the plurality of drive cam grooves, respectively;
a driven cam that has a plurality of driven cam grooves formed at one end surface of the driven cam while each of the plurality of rolling elements is clamped between a corresponding one of the plurality of drive cam grooves and a corresponding one of the plurality of driven cam grooves, wherein the driven cam cooperates with the drive cam and the plurality of rolling elements to form a rolling element cam, and when relative rotation is made between the driven cam and the drive cam, the driven cam is moved in an axial direction relative to the drive cam;
a second transmitter that is configured to transmit the torque between the first transmitter and the second transmitter;
a clutch that is configured to enable transmission of the torque between the first transmitter and the second transmitter in a coupled state of the clutch and disable the transmission of the torque between the first transmitter and the second transmitter in a decoupled state of the clutch; and
a state shifter that is configured to receive a force from the driven cam in the axial direction and shift an operational state of the clutch between the coupled state and the decoupled state depending on a relative position of the driven cam relative to the drive cam in the axial direction, wherein:
in each of the plurality of drive cam grooves, a groove bottom is sloped relative to the one end surface of the drive cam such that a depth of the groove bottom continuously decreases from one end to another end of the drive cam groove in a circumferential direction of the drive cam while each of the plurality of drive cam grooves has:
a first drive cam groove that is formed such that a distance between a center of the drive cam and the groove bottom at the first drive cam groove continuously changes from the one end toward the another end of the drive cam groove; and
a second drive cam groove that is connected to the first drive cam groove and is formed such that a distance between the center of the drive cam and the groove bottom at the second drive cam groove is constant from the first drive cam groove to the another end of the drive cam groove;
in each of the plurality of driven cam grooves, a groove bottom is sloped relative to the one end surface of the driven cam such that a depth of the groove bottom continuously decreases from one end to another end of the driven cam groove in a circumferential direction of the driven cam while each of the plurality of driven cam grooves has:
a first driven cam groove that is formed such that a distance between a center of the driven cam and the groove bottom at the first driven cam groove continuously changes from the one end toward the another end of the driven cam groove; and
a second driven cam groove that is connected to the first driven cam groove and is formed such that a distance between the center of the driven cam and the groove bottom at the second driven cam groove is constant from the first driven cam groove to the another end of the driven cam groove; and
a shape of each of the plurality of drive cam grooves, which is viewed in the axial direction from one axial side where the driven cam is placed, is the same as a shape of each of the plurality of driven cam grooves, which is viewed in the axial direction from an opposite axial side where the drive cam is placed.

* * * * *